US007363650B2

(12) United States Patent
Moriconi et al.

(10) Patent No.: US 7,363,650 B2
(45) Date of Patent: *Apr. 22, 2008

(54) SYSTEM AND METHOD FOR INCREMENTALLY DISTRIBUTING A SECURITY POLICY IN A COMPUTER NETWORK

(75) Inventors: Mark S. Moriconi, Atherton, CA (US); Simon Godik, Seaside, CA (US); Mingde Xu, Redwood City, CA (US); Ken Yagen, San Francisco, CA (US)

(73) Assignee: BEA Systems, Inc., San Jose, CA (US)

( * ) Notice: Subject to any disclaimer, the term of this patent is extended or adjusted under 35 U.S.C. 154(b) by 816 days.

This patent is subject to a terminal disclaimer.

(21) Appl. No.: 10/243,122

(22) Filed: Sep. 13, 2002

(65) Prior Publication Data

US 2003/0115484 A1 Jun. 19, 2003

Related U.S. Application Data

(60) Division of application No. 10/017,368, filed on Dec. 13, 2001, which is a continuation-in-part of application No. 09/721,557, filed on Nov. 22, 2000, which is a continuation of application No. 09/248,788, filed on Feb. 12, 1999, now Pat. No. 6,158,010, said application No. 10/017,368 is a continuation-in-part of application No. 09/767,610, filed on Jan. 22, 2001, now Pat. No. 6,941,472, which is a continuation of application No. 09/721,557, filed on Nov. 22, 2000.

(60) Provisional application No. 60/255,623, filed on Dec. 13, 2000, provisional application No. 60/105,963, filed on Oct. 28, 1998.

(51) Int. Cl.
*H04L 9/00* (2006.01)

(52) U.S. Cl. .......................................................... 726/1

(58) Field of Classification Search ................... 726/3, 726/1
See application file for complete search history.

(56) References Cited

U.S. PATENT DOCUMENTS 5,173,939 A  12/1992  Abadi et al. .................... 707/9

(Continued)

FOREIGN PATENT DOCUMENTS

EP    1 256 889 A2    11/2002

(Continued)

OTHER PUBLICATIONS

USDataCenters . . . eBusiness, Business Wire, p. 2079. Apr. 4, 2001.

(Continued)

*Primary Examiner*—Nasser Moazzami
*Assistant Examiner*—David Garcia Cervetti
(74) *Attorney, Agent, or Firm*—Fliesler Meyer LLP

(57) ABSTRACT

A system and method for generating an updated version of, or reconstructing a previously enforced version of, a local client security policy stored in an application guard. A policy manager distributes a change (or an accumulation of changes) to the currently enforced version of the security policy through a network to the application guard. The application guard uses the distributed change to update the currently enforced version of the local client security policy. To reconstruct a previously enforced version of a local security policy, the policy manager generates a reversing delta equal to the reverse of the change (or accumulation of changes) from a previously enforced version to the currently enforced version of the security policy, and distributes the reversing delta through the network to the application guard. The application guard applies the distributed reversing delta to the currently enforced version to reconstruct the previously enforced version.

32 Claims, 20 Drawing Sheets

U.S. PATENT DOCUMENTS

| | | | |
|---|---|---|---|
| 5,237,614 A * | 8/1993 | Weiss | 713/159 |
| 5,265,221 A | 11/1993 | Miller | 395/725 |
| 5,335,345 A | 8/1994 | Frieder et al. | |
| 5,347,653 A * | 9/1994 | Flynn et al. | 707/203 |
| 5,355,474 A * | 10/1994 | Thuraisngham et al. | 707/9 |
| 5,369,702 A | 11/1994 | Shanton | 308/4 |
| 5,426,747 A | 6/1995 | Weinreb et al. | |
| 5,481,700 A | 1/1996 | Thuraisingham | 707/9 |
| 5,544,322 A * | 8/1996 | Cheng et al. | 709/229 |
| 5,557,747 A | 9/1996 | Rogers et al. | 395/200.11 |
| 5,577,209 A | 11/1996 | Boyle et al. | |
| 5,627,886 A | 5/1997 | Bowman | 379/111 |
| 5,757,669 A | 5/1998 | Christie et al. | |
| 5,797,128 A | 8/1998 | Birnbaum | 707/5 |
| 5,809,230 A | 9/1998 | Pereira | 395/186 |
| 5,825,883 A | 10/1998 | Archibald et al. | |
| 5,826,000 A | 10/1998 | Hamilton | |
| 5,826,268 A | 10/1998 | Schaefer et al. | 707/9 |
| 5,835,726 A | 11/1998 | Shwed et al. | 395/200.59 |
| 5,841,869 A | 11/1998 | Merkling et al. | 380/25 |
| 5,848,396 A | 12/1998 | Gerace | 705/10 |
| 5,867,667 A | 2/1999 | Butman et al. | |
| 5,872,928 A | 2/1999 | Lewis et al. | |
| 5,889,953 A | 3/1999 | Thebaut et al. | |
| 5,918,210 A * | 6/1999 | Rosenthal et al. | 705/7 |
| 5,941,947 A | 8/1999 | Brown et al. | |
| 5,950,195 A * | 9/1999 | Stockwell et al. | 707/4 |
| 5,954,798 A | 9/1999 | Shelton et al. | |
| 5,956,400 A * | 9/1999 | Chaum et al. | 713/167 |
| 5,956,521 A | 9/1999 | Wang | |
| 5,966,707 A | 10/1999 | Van Huben et al. | |
| 5,968,176 A | 10/1999 | Nessett et al. | 713/201 |
| 5,983,270 A | 11/1999 | Abraham et al. | 709/224 |
| 5,983,350 A | 11/1999 | Minear et al. | 713/201 |
| 5,987,469 A | 11/1999 | Lewis et al. | |
| 5,987,611 A | 11/1999 | Freund | |
| 5,991,877 A | 11/1999 | Luckenbaugh | 713/200 |
| 5,991,879 A | 11/1999 | Still | |
| 5,999,978 A | 12/1999 | Angal et al. | 709/229 |
| 6,005,571 A | 12/1999 | Pachauri | 715/764 |
| 6,006,194 A * | 12/1999 | Merel | 705/8 |
| 6,009,507 A | 12/1999 | Brooks et al. | |
| 6,029,144 A * | 2/2000 | Barrett et al. | 705/30 |
| 6,029,182 A | 2/2000 | Nehab et al. | 345/356 |
| 6,029,196 A | 2/2000 | Lenz | |
| 6,029,246 A | 2/2000 | Bahr | |
| 6,035,399 A | 3/2000 | Klemba et al. | 713/200 |
| 6,054,910 A | 4/2000 | Tada et al. | |
| 6,055,515 A | 4/2000 | Consentino et al. | |
| 6,055,636 A | 4/2000 | Hillier et al. | |
| 6,055,637 A | 4/2000 | Hudson et al. | |
| 6,070,244 A | 5/2000 | Orchier et al. | |
| 6,073,242 A | 6/2000 | Hardy | |
| 6,083,276 A | 7/2000 | Davidson et al. | 717/107 |
| 6,088,451 A | 7/2000 | He et al. | |
| 6,098,173 A * | 8/2000 | Elgressy et al. | 726/17 |
| 6,105,027 A | 8/2000 | Schneider et al. | |
| 6,108,687 A | 8/2000 | Craig | |
| 6,122,647 A | 9/2000 | Horowitz et al. | |
| 6,141,010 A | 10/2000 | Hoyle | 345/356 |
| 6,141,686 A * | 10/2000 | Jackowski et al. | 709/224 |
| 6,148,333 A | 11/2000 | Guedalia et al. | |
| 6,154,741 A | 11/2000 | Feldman | 707/9 |
| 6,154,844 A * | 11/2000 | Touboul et al. | 726/24 |
| 6,157,924 A | 12/2000 | Austin | 707/10 |
| 6,158,010 A | 12/2000 | Moriconi et al. | 713/201 |
| 6,167,407 A * | 12/2000 | Nachenberg et al. | 707/203 |
| 6,167,445 A | 12/2000 | Gai et al. | |
| 6,170,009 B1 * | 1/2001 | Mandal et al. | 709/223 |
| 6,182,226 B1 | 1/2001 | Reid et al. | 713/201 |
| 6,182,277 B1 | 1/2001 | Degroot et al. | |
| 6,185,587 B1 | 2/2001 | Bernardo et al. | |
| 6,202,066 B1 | 3/2001 | Barkley et al. | |
| 6,202,157 B1 * | 3/2001 | Brownlie et al. | 726/1 |
| 6,202,207 B1 | 3/2001 | Donohue | |
| 6,209,101 B1 * | 3/2001 | Mitchem et al. | 726/2 |
| 6,216,231 B1 * | 4/2001 | Stubblebine | 726/10 |
| 6,226,745 B1 | 5/2001 | Wiederhold | 713/200 |
| 6,230,271 B1 | 5/2001 | Wadlow et al. | |
| 6,233,686 B1 | 5/2001 | Zenchelsky et al. | |
| 6,241,608 B1 | 6/2001 | Torango | 463/27 |
| 6,243,747 B1 | 6/2001 | Lewis et al. | |
| 6,253,321 B1 * | 6/2001 | Nikander et al. | 713/160 |
| 6,256,741 B1 | 7/2001 | Stubblebine | |
| 6,260,050 B1 | 7/2001 | Yost et al. | 707/501 |
| 6,269,393 B1 | 7/2001 | Yost et al. | 709/201 |
| 6,269,456 B1 * | 7/2001 | Hodges et al. | 714/38 |
| 6,275,941 B1 * | 8/2001 | Saito et al. | 726/2 |
| 6,285,366 B1 | 9/2001 | Ng et al. | |
| 6,285,985 B1 | 9/2001 | Horstmann | 705/14 |
| 6,292,900 B1 | 9/2001 | Ngo et al. | |
| 6,295,607 B1 | 9/2001 | Johnson | |
| 6,304,881 B1 | 10/2001 | Halim et al. | |
| 6,308,163 B1 | 10/2001 | Du et al. | 705/8 |
| 6,317,868 B1 * | 11/2001 | Grimm et al. | 717/127 |
| 6,321,336 B1 | 11/2001 | Applegate et al. | |
| 6,324,685 B1 | 11/2001 | Balassanian | |
| 6,339,826 B2 | 1/2002 | Hayes et al. | |
| 6,341,352 B1 * | 1/2002 | Child et al. | 726/1 |
| 6,353,886 B1 * | 3/2002 | Howard et al. | 713/156 |
| 6,360,363 B1 | 3/2002 | Moser et al. | |
| 6,377,973 B2 | 4/2002 | Gideon | |
| 6,385,627 B1 | 5/2002 | Cragun | |
| 6,393,474 B1 * | 5/2002 | Eichert et al. | 709/223 |
| 6,397,222 B1 | 5/2002 | Zellweger | |
| 6,397,231 B1 | 5/2002 | Salisbury et al. | |
| 6,408,336 B1 | 6/2002 | Schneider | |
| 6,412,070 B1 | 6/2002 | Van Dyke et al. | |
| 6,412,077 B1 * | 6/2002 | Roden et al. | 714/4 |
| 6,418,448 B1 | 7/2002 | Sarkar | |
| 6,453,345 B2 | 9/2002 | Trcka et al. | |
| 6,453,353 B1 | 9/2002 | Win et al. | |
| 6,457,007 B1 | 9/2002 | Kikuchi et al. | |
| 6,460,141 B1 | 10/2002 | Olden | |
| 6,463,470 B1 | 10/2002 | Mohaban et al. | |
| 6,466,239 B2 | 10/2002 | Ishikawa | |
| 6,466,932 B1 | 10/2002 | Dennis et al. | |
| 6,466,947 B2 | 10/2002 | Arnold | |
| 6,473,791 B1 * | 10/2002 | Al-Ghosein et al. | 709/217 |
| 6,477,543 B1 | 11/2002 | Huang et al. | |
| 6,477,575 B1 | 11/2002 | Koeppel et al. | |
| 6,484,177 B1 | 11/2002 | Van Huben et al. | |
| 6,484,261 B1 * | 11/2002 | Wiegel | 726/11 |
| 6,519,647 B1 | 2/2003 | Howard et al. | |
| 6,530,024 B1 * | 3/2003 | Proctor | 726/23 |
| 6,539,375 B2 | 3/2003 | Kawasaki | 707/5 |
| 6,539,414 B1 | 3/2003 | Klein et al. | |
| 6,553,498 B1 | 4/2003 | Elgressy et al. | |
| 6,571,247 B1 | 5/2003 | Danno et al. | 717/100 |
| 6,584,454 B1 | 6/2003 | Hummel et al. | |
| 6,587,849 B1 | 7/2003 | Mason et al. | 707/5 |
| 6,615,218 B2 * | 9/2003 | Mandal et al. | 707/102 |
| 6,618,806 B1 | 9/2003 | Brown et al. | |
| 6,633,538 B1 | 10/2003 | Tanaka et al. | |
| 6,654,747 B1 | 11/2003 | Van Huben et al. | |
| 6,665,677 B1 | 12/2003 | Wotring et al. | |
| 6,668,354 B1 | 12/2003 | Chen et al. | 715/517 |
| 6,678,827 B1 | 1/2004 | Rothermel et al. | |
| 6,684,369 B1 | 1/2004 | Bernardo et al. | |
| 6,718,380 B1 | 4/2004 | Mohaban et al. | |
| 6,721,888 B1 * | 4/2004 | Liu et al. | 713/191 |
| 6,735,586 B2 | 5/2004 | Timmons | 707/3 |
| 6,735,701 B1 * | 5/2004 | Jacobson | 726/1 |
| 6,738,789 B2 | 5/2004 | Multer | 707/201 |

| | | | |
|---|---|---|---|
| 6,751,659 B1* | 6/2004 | Fenger et al. | 709/223 |
| 6,754,672 B1 | 6/2004 | McLauchlin | 707/104 |
| 6,769,118 B2* | 7/2004 | Garrison et al. | 717/177 |
| 6,772,332 B1 | 8/2004 | Boebert et al. | |
| 6,779,002 B1 | 8/2004 | Mwaura | 707/203 |
| 6,785,728 B1 | 8/2004 | Schneider et al. | |
| 6,789,202 B1* | 9/2004 | Ko et al. | 726/23 |
| 6,880,005 B1* | 4/2005 | Bell et al. | 709/225 |
| 6,904,454 B2 | 6/2005 | Stickler | |
| 6,920,457 B2 | 7/2005 | Pressmar | |
| 6,922,695 B2 | 7/2005 | Skufca et al. | 707/10 |
| 6,934,934 B1 | 8/2005 | Osborne, II et al. | 717/126 |
| 6,941,472 B2 | 9/2005 | Moriconi et al. | |
| 6,957,261 B2* | 10/2005 | Lortz | 709/226 |
| 6,961,897 B1 | 11/2005 | Peel et al. | |
| 6,965,999 B2* | 11/2005 | Fox et al. | 726/22 |
| 6,970,876 B2 | 11/2005 | Hotti et al. | |
| 7,051,316 B2 | 5/2006 | Charisius et al. | |
| 7,062,490 B2 | 6/2006 | Adya et al. | |
| 7,076,652 B2 | 7/2006 | Ginter et al. | |
| 7,080,000 B1* | 7/2006 | Cambridge | 703/21 |
| 7,143,151 B1 | 11/2006 | Kayashima et al. | |
| 7,171,441 B2* | 1/2007 | Shiouchi et al. | 709/202 |
| 7,174,563 B1 | 2/2007 | Brownlie et al. | |
| 7,272,625 B1 | 9/2007 | Hannel et al. | |
| 2002/0029278 A1* | 3/2002 | Shiouchi et al. | 709/229 |
| 2002/0059394 A1 | 5/2002 | Sanders | |
| 2002/0062451 A1* | 5/2002 | Scheidt et al. | 713/201 |
| 2002/0069261 A1 | 6/2002 | Bellare et al. | |
| 2002/0107913 A1 | 8/2002 | Rivera et al. | |
| 2002/0173971 A1 | 11/2002 | Stirpe et al. | |
| 2002/0178119 A1 | 11/2002 | Griffin et al. | |
| 2003/0131113 A1 | 7/2003 | Reeves et al. | |
| 2003/0229623 A1 | 12/2003 | Chang et al. | |
| 2004/0024812 A1 | 2/2004 | Park et al. | |
| 2004/0153451 A1 | 8/2004 | Phillips et al. | |
| 2004/0205473 A1 | 10/2004 | Fisher et al. | |
| 2004/0205557 A1 | 10/2004 | Bahrs et al. | |
| 2004/0230546 A1 | 11/2004 | Rogers | |
| 2006/0122882 A1 | 6/2006 | Brown et al. | |
| 2006/0167858 A1 | 7/2006 | Dennis et al. | |

FOREIGN PATENT DOCUMENTS

| | | |
|---|---|---|
| WO | WO 00/38078 | 6/2000 |
| WO | WO 01/14962 | 3/2001 |
| WO | 01/67285 A2 | 9/2001 |

OTHER PUBLICATIONS

International Search Report for PCT/US04/04140 dated Feb. 17, 2005 (2 pages).
Written Opinion for PCT/US04/04140 dated Dec. 12, 2005 (5 pages).
International Search Report for PCT/US04/04078 dated Nov. 18, 2005.
Written Opinion for PCT/US04/04078 dated Nov. 18, 2005.
Hunter, Jason, "Java Servlet Programming", second edition, O'Reilly, Jan. 11, 2001.
Eiji Okamoto, "Proposal for Integrated Security System", Jun. 1992, IEEE computer Society Press, pp. 354-358.
http://java.sun.com/products/ejb/ (last visit: Dec. 7, 2004).
http://www.javaworld.com/javaworld/jw-1207-yesnoejb_.html (last visit: Dec. 7, 2004).
Sundsted, Todd, "JNDI Overview, Part 1: An Introduction to Naming Services", JavaWorld, Jan. 2000, pp. 1-6, (downloaded from: www.javaworld.com/javaworld/jw-01-howto_p.html).
Moore, Bill et al., "Migrating Weblogic Applications to WebSphere Advanced Edition", IBM Redbooks, Jan. 2001, pp. 1,3-4, 109-111 and 181-195.

Barrett, Alexandra, "Trying Out Transactions", SunExpert Magazine, Jan. 1999, pp. 57-59.
Ayers, Danny, et al., Professional Java Server Programming, Wrox Press, Ltd., Birmingham, UK, Dec. 1999, pp. 515-545.
Ford, Nigel, Web Developer.com Guide to Building Intelligent Web Sites with JavaScript, Wiley Computer Publishing, New York, NY, © 1998, pp. 65-86, 96-98, 101-102, 245-250 and 324-327.
European Search Report for 02723874.0 dated Jun. 7, 2006 (3 pages).
Parker, Elisabeth, "The Complete Idiot's Guide® to Microsoft® FrontPage 2000", QUE®, Indianapolis, IN, pp. 7 and 52 (1999).
Symborski, C.W., "Updating software and configuration data in a distributed communications network", Computer Networking Symposium, Washington, D.C., 1988, pp. 331-338.
European Search Report for EP 02 77 3915 dated Oct. 5, 2006 (3 pages).
Atkins, David L., et al., "Mawl: A Domain-Specific Languages for Form-Based Services," IEEE Transactions on Software Engineering, IEEE Service Center, Los Alamitos, CA, US, vol. 25, No. 3, pp. 334-346 (May 1999).
Kistler, Thomas, et al., "WebL—A Programming Language for the Web," Computer Networks and ISDN Systems, North Holland Publishing, Amsterdam, NL, vol. 30, No. 1-7, pp. 259-270 (Apr. 1998).
Levy, Michael R., "Web Progamming in Guide," Software Practice & Experience, Wiley & Sons, Bognor Regis, GB, vol. 28, No. 15, pp. 1581-1603 (Dec. 25, 1998).
Supplementary European Search Report for EP 01 97 5484 dated Dec. 19, 2006, 2 pages.
Catley, Christina, et al., "Design of a Health Care Architecture for Medical Data Interoperability and Application Integration," Proceedings of the Second Joint EMBS/BMES Conference, Houston, Texas, USA, Oct. 23-26, 2002, IEEE, vol. 3, pp. 1952-1953.
Browne, Shirley, et al., "Location-Independent Naming for Virtual Distribution Software Repositories," ACM Symposium of Software Reusability, Seattle, WA, US, vol. 20, Issue SI, pp. 179-185 (Aug. 1995).
Howes, T., "The String Representation of LDAP Search Filters," © The Internet Society, RFC 2254, 8 pages (Dec. 1997).
Freudenthal, Erich, et al., "dRBAC: Distributed Role-Based Access Control for Dynamic Coalition Environments", Proceedings of the 22nd International Conference of Distributed Computing Systems (ICDCS '02) IEEE 2002, 10 pages.
Zhang, Zheng, et al., "Designing a Robust Namespace for Distributed File Services", Reliable Distributed System, 2001, Proceedings 20th IEEE Symposium on Oct. 28-31, 2001, pp. 162-171.
Adya, Atul, et al., "Farsite: Federated, Available, and Reliable Storage for an Imcompletely Trusted Environment" ACM SIGOPS Operating Systems Review, vol. 36, Issue SI (Winter 2002), OSDI '02, Proceedings of the 5th Symposium on Operating Systems Design and Implementation, pp. 1-14.
Adomavicius, Gediminas, et al., "User Profiling in Personalization Applications Through Rule Discovery and Validation", KDD '99, San Diego, CA, ACM,1999, pp. 377-381.
Cingil, Ibrahim, et al., "A Broader Approach to Personalization", Communications of the ACM, vol. 43, No. 6, Aug. 2000, pp. 136-141.

Stephanidis, Constantine, et al., "Decision Making in Intelligent User Interfaces", IUI '97, Orlando, FL, ACM, 1997, pp. 195-202.

Stiemerling, Oliver, et al., "How to Make Software Softer—Designing Tailorable Applications", DIS '97, Amsterdam, The Netherlands, ACM, 1997, pp. 365-376.

Candan, K.S., et al., "Enabling Dynamic Content Caching for Database-Driven Web Sites," Proceedings of the 2001 ACM SIGMOND International Conference on Management of Data, Santa Barbara, CA, ACM, 2001, pp. 532-543.

International Search Report and Written Opinion for PCT/US06/10451, dated Oct. 19, 2007. 7 pages.

Koved, L., et al. "Security Challenges for Enterprise Java in an E-business Environment," IBM Systems Journal, vol. 40, No. 1, pp. 130-152 (Jan. 2001).

Microsoft Windows ("Windows Explorer") copyright 1981-2001, 3 pages.

Ryutov, T., et al., Dynamic Authorization and Intrusion Response in Distributed Systems, DARPA, vol. 1, pp. 50-61 (Apr. 2003).

"Method and System for Visually Constructing Document Type Definitions and Related Artifacts Using a Reusable Object Model," IBM Technical Disclosures Bulletin, May 23, 2001, 3 pages.

Anand, Rangachari, et al., "A Flexible Security Model for Using Internet Content," IEEE, pp. 89-96 (1997).

Anderson, Paul, "Towards a High-Level Machine Configuration System," 1994 LISA, Sep. 19-23, 1994, San Diego, California, pp. 19-26.

Apostolopoulos, T.K., et al., "Enforcing Security Policies in Large Scale Communication Networks," 5 pages.

Bertino, Elisa, et al., "TRBAC: A Temporal Role-Based Access Control Model," ACM Transactions on Information and System Security (TISSEC), vol. 4, Issue 3, pp. 191-223 (Aug. 2001).

Casella, Karen A. "Security Administration in an Open Networking Environment," 1995 Lisa IX, Monterey, California, Sep. 17-22, 1995, pp. 67-74.

Convington, Michael J., et al., "Securing Context-Aware Applications Using Environment Roles," ACM Workshop on Role Based Access Control, Proceedings of the Sixth ACM Symposium on Access Control Models and Technologies, pp. 10-20 (2001).

Georgiadis, Christos K., et al. "Flexible Team-Based Access Control Using Contexts," ACM Workshop on Role Based Access Control, Proceedings of the Sixth ACM Symposium on Access Control Methods and Technologies, pp. 21-27 (2001).

Goh, Chen, et al., "Towards a more Complete Model of Role," Symposium on Access Control Models and Technologies, Proceedings of the Third ACM Workshop on Role-Based Access Control, pp. 56-61 (1998).

Harris, J. Archer, et al. "The Design and Implementation of a Network Account Management System," 1996 Lisa X, Chicago, IL, Sep. 29-Oct. 4, 1996, pp. 33-42.

Hayton, R.J., et al., "Access Control in an Open Distributed Environment," 12 pages (1998).

Lee, Amy J., et al., "Keeping Virtual Information Resources up and Running," IBM Press, pp. 1-14 (Nov. 1997).

Petrosky, Mary, "Directories in the Limelight," Network World, Mar. 16, 1998, 15, 11, ABI/INFORM Global, pp. 42-46 (1998).

Rossi, Gustavo, et al., "Designing Personalized Web Applications," ACM, WWW 10, Hong Kong, May 1-5, 2001, pp. 275-284.

Sandhu, Ravi S., et al. "Role-Based Access Control Models," IEEE Computer, vol. 29, No. 2, pp. 38-47 (Feb. 1996).

Schwartau, Winn, "Securing the Enterprise," Network World, Jan. 27, 1997, 14, 4, ABI/INFORM Global, pp. 42 (1997).

Tanyi, Emmanuel, "Easy XML," www.winsite.com, pp. 1-6 (Mar. 2000).

Trostle, Jonathan, et al. "A Flexible Distributed Authorization Protocol," IEEE, Proceedings of SNDSS '96, pp. 43-52 (1996).

Tzelepi, Sofia K., et al., "A Flexible Content and Context-Based Access Control Model for Multimedia Medical Image Database Systems," International Multimedia Conference, Proceedings of the 2001 Workshop on Multimedia and Security, pp. 52-55 (Oct. 5, 2001).

Yao, Walt, et al., " A Model of OASIS Role-Based Access Control and its Support for Active Security," ACM Workshop on Role Based Access Control, Proceedings of the Sixth ACM Symposium on Access Control Methods and Technologies, pp. 171-181 (2001).

* cited by examiner

SYSTEM AND METHOD FOR INCREMENTALLY DISTRIBUTING A SECURITY POLICY IN A COMPUTER NETWORK

CROSS-REFERENCE TO RELATED APPLICATIONS

This application is a divisional, and claims benefit, of U.S. patent application Ser. No. 10/017,368, filed Dec. 13, 2001, which is a continuation-in-part of Ser. No. 09/721,557, filed Nov. 22, 2000, which is a continuation of U.S. patent application Ser. No. 09/248,788, filed Feb. 12, 1999, now U.S. Pat. No. 6,158,010, which claims the benefit of U.S. Provisional Patent Application No. 60/105,963, filed on Oct. 28, 1998; and U.S. patent application Ser. No. 10/017,368, filed Dec. 13, 2001 is also a continuation-in-part of U.S. patent application Ser. No. 09/767,610, filed Jan. 22, 2001 now U.S. Pat. No. 6,941,472 which is a continuation of U.S. patent application Ser. No. 09/721,557, filed Nov. 22, 2000; and U.S. patent application Ser. No. 10/017,368, filed Dec. 13, 2001 also claims the benefit of U.S. Provisional Patent Application No. 60/255,623, filed Dec. 13, 2000, all of which are incorporated by reference.

BACKGROUND OF THE INVENTION

1. Field of the Invention

This invention relates generally to computer security systems, and relates more particularly to a system and method for managing and enforcing complex security requirements in a distributed computer network.

2. Discussion of the Background Art

Computer security issues have become more complex with the continual evolution of contemporary computer systems. As corporations utilize increasingly distributed and open computing environments, the security requirements of an enterprise typically grow accordingly. The complexity of employee, customer and partner access to critical information assets, while assuring proper security, has proven to be a major hurdle. For example, many organizations deploy applications that allow their external business partners, as well as their own internal employees, to access sensitive information resources within the enterprise. In the absence of adequate security measures, an enterprise may thus be subject to the risk of decreased security and confidentiality.

While most organizations focus their security concerns on protecting the internal network from the outside world, it is estimated that 80-90% of all corporate security breaches come from within an organization (source: Aberdeen Group, September 1997). This further underscores the need to specify and enforce an access control security policy within the enterprise network.

In today's complex business environment, specifying, stating, implementing and managing an enterprise access control policy may be both difficult and inefficient. When corporate data and applications revolved around a mainframe model, the problem of defining and managing access to corporate applications was relatively straightforward. Today, the complexity of business methods, as well as the complexity of distributed application architectures, may force companies to resort to ineffective, manual or highly custom approaches to access control in their attempts to implement the business process.

To secure a complex and distributed computer system, the system may typically employ a combination of encryption, authentication, and authorization technologies. Encryption is a means of sending information between participants in a manner that prevents other parties from reading the information. Authentication is a process of verifying a party's identity. Authorization is a technique for determining what actions a participant is allowed to perform.

Encryption and authentication are well understood and have led to effective network security products, whereas authorization technology is not as well developed, and is often inadequate for many enterprises. The security approach of most companies today is to focus on the authentication of users to ensure that those users are part of the organization or members of select groups. Authentication can be accomplished with a number of different approaches, from simple password or challenge response mechanisms to smart cards and biometric devices such as fingerprint readers. Once users are authenticated, however, there is still a significant problem in managing and enforcing their sets of privileges, which may be unique and vary widely between users. The same authentication mechanism can be used for every user, but different authorization mechanisms must be developed for most applications. Therefore, reliable and efficient access control is a much more difficult problem facing enterprises today.

Authentication mechanisms often work together with some sort of access control facility that can protect information resources from unauthorized users. Examples of network security products include firewalls, digital certificates, virtual private networks, and single sign-on systems. Some of these products provide limited support for resource-level authorization. For example, a firewall can screen access requests to an application or a database, but does not provide object-level authorization within an application or database. Single Sign-On (SSO) products, for example, maintain a list of resources an authenticated user can access by managing the login process to many different applications. However, firewalls, SSO and other related products are very limited in their ability to implement a sophisticated security policy characteristic of many of today's enterprises. They are limited to attempting to manage access at a login, or "launch level," which is an all or nothing approach that cannot directly implement a policy that spans an entire enterprise.

A real-world security policy that spans a large enterprise, otherwise known as an enterprise or global security policy, uses a detailed and dynamic knowledge base specific to that enterprise. The authorization privileges are specific to the constantly evolving sets of users, applications, partners, and global policies that the enterprise puts in place to protect its key information resources. A security policy that spans a large enterprise can consist of tens or hundreds of thousands of individual rules that cover which users are authorized to access particular applications, perform various operations, or manage the delegation and transfer of tasks. Many of these policy rules that implement the business practice of an organization have to be hard-coded within custom-built applications or stored in a database.

The key problem is that the policy rules that make up an enterprise or global security policy are localized, scattered throughout the organization, and embedded in applications and databases. Such embedding is expensive and error-prone, militating against efficient policy updates. An organization cannot effectively implement and manage the resulting policy. Inconsistencies arise and updates can quickly become unmanageable. Policy queries and analysis from a global perspective are nearly impossible. The resulting policy begins to diverge from the intended business practices of the organization. Compromises are made in the policy implementation at the department level, and auditors can quickly become frustrated.

The increasing security risks associated with the proliferation of distributed computing, including Intranet and Extranet applications, are prompting many organizations to explore a broad range of security solutions for controlling access to their important information assets. Although organizations have a number of solutions to choose from for authenticating users (determining and verifying who is attempting to gain access to the network or individual applications), there is little choice when it comes to controlling what users can do and when they can do it to the extent necessary to implement the kinds of complex security policies required by modern organizations. Organizations have been forced to choose between custom authorization solutions that are costly, error-prone, and difficult to manage, and third-party solutions that are very limited in their abilities to control access to information across applications and databases.

A real-world security policy determines which users are authorized to access particular applications, perform various operations or manage the delegation and transfer of tasks, as well as when and under what circumstances they are permitted to do so. Authorization privileges depend upon a constantly evolving set of users, applications, partners, and business polices that comprise the enterprise or global security policy. A typical enterprise environment consists of several thousand users, hundreds of applications, and a myriad of network resources, resulting in a security policy that can consist of tens or hundreds of thousands of inter-related policy rules.

Typically, organizations attempt to control access to the internals of in-house applications through policy rules that are hard-coded in the application or through stored procedure statements in the database. But as the number of applications and databases grows, this patchwork approach to authorization quickly gets out of hand. First, organizations must incur the costly and time-consuming overhead of developing customized security code for each application. But more importantly, once the code is developed and embedded in an application, the embedded policy rules become hard to track, difficult to update, and nearly impossible to manage because they are scattered throughout the organization.

With an estimated 80 percent of all security breaches coming from authorized users (source: Forrester Research), advanced policy features and enforcement mechanisms are needed to control access to sensitive information assets. To implement an enterprise or global security policy, organizations need a centralized policy and a powerful way to specify policy rules to give them adequate access control security. At the same time, organizations need a distributed infrastructure that can provide authorization services to all applications and has performance and scalability characteristics mandated by modern distributed network environments.

A security policy that spans an entire organization, in practice, involves constant changes, such as environmental, organizational, operational, and IT structural changes. As a result, the policy in such a system needs to be frequently updated. However, such a policy may contain thousands of rules, applications and users. In a distributed system, these applications and users may be scattered through many geographically separated locations, which are connected to each other through a network. Consequently, distributing an updated policy can congest the network and delay implementation of the newly updated policy. Further, a currently enforced version of a policy may be generated based on a sequence of changes to a sequence of previously enforced versions of the policy. Each version change may involve many rule changes, such as adding new rules and deleting or amending some of the existing rules. During theses changes, errors can be made and rule change decisions can be altered. Therefore, it may be necessary to reconstruct one of the previously enforced versions of a policy. However, after many rule changes, it is difficult and time consuming to accurately reconstruct a previously enforced version of such a policy, especially over a distributed network.

In addition, a policy may contain thousands of inter-related rules which are enforced for many functional branches in an organization and hundreds of applications used by thousands of users. Conventional security policy systems do not provide sophisticated policy analysis functions, which prevents managers and policy administrators from comprehensively understanding how policies will be enforced. This may result in various policies having inconsistent or contradictory rules. To enable management and policy administrators to efficiently and comprehensively manage or maintain sound policies, it is desirable to provide a system capable of performing comprehensive policy analysis, including policy inquiry, policy verification, and policy cross-referencing.

Therefore, there is a need for an improved system to protect distributed networks against unauthorized access, by managing and enforcing complex security policy requirements for the enterprise.

There is also a need for an improved centralized policy management system which separates or externalizes security policy rules from applications.

There is also a need for an improved system for efficiently distributing updated or changed policies that protect access to applications.

There is another need for an improved system for efficiently reconstructing, based on the currently enforced version of a policy, a previously enforced version of that policy.

There is still another need for an improved system for providing comprehensive policy analysis, including policy inquiry, policy verification and policy cross-referencing.

SUMMARY OF THE INVENTION

The distributed computing environment generally comprises a policy manager located on a server for managing a global security policy and, based on the global security policy, managing and distributing a local client security policy to a client or server associated with one or more clients (otherwise known as client servers). The global security policy specifies a user's privileges to access securable components in the environment. An application guard located on a client server manages authorization requests to control access to securable components as specified by the local client security policy. Each authorization request may be recorded in an audit log to keep track of the authorization requests, whether the requests were granted or denied, and other similarly useful information.

One embodiment of the invention updates a local client security policy stored in an application guard by distributing accumulated changes to a currently enforced version of the security policy through a network to the application guard. The application guard uses the distributed accumulated changes to update the local client security policy. In another embodiment of the invention a policy manager reconstructs a previously enforced version of a local client security policy by generating an accumulated reversing delta based on accumulated changes between the previously enforced version and the currently enforced version of the security policy. The policy manager distributes the reversing delta through a network to the application guard, and the application guard combines the currently enforced version with the reversing delta to reconstruct the previously enforced version of the local client security policy.

DETAILED DESCRIPTION OF THE PREFERRED EMBODIMENT

The present invention relates to an improvement in security techniques to protect computer systems against unauthorized access. The invention preferably includes a system and method for managing and enforcing complex security requirements in a distributed computer network, and comprises a policy manager located on a server for managing and distributing changes to a local client security policy based on a global security policy, and an application guard located on either a client or a client server, the application guard acting to grant or deny access to securable components, as specified by the local client security policy.

Figure 1:
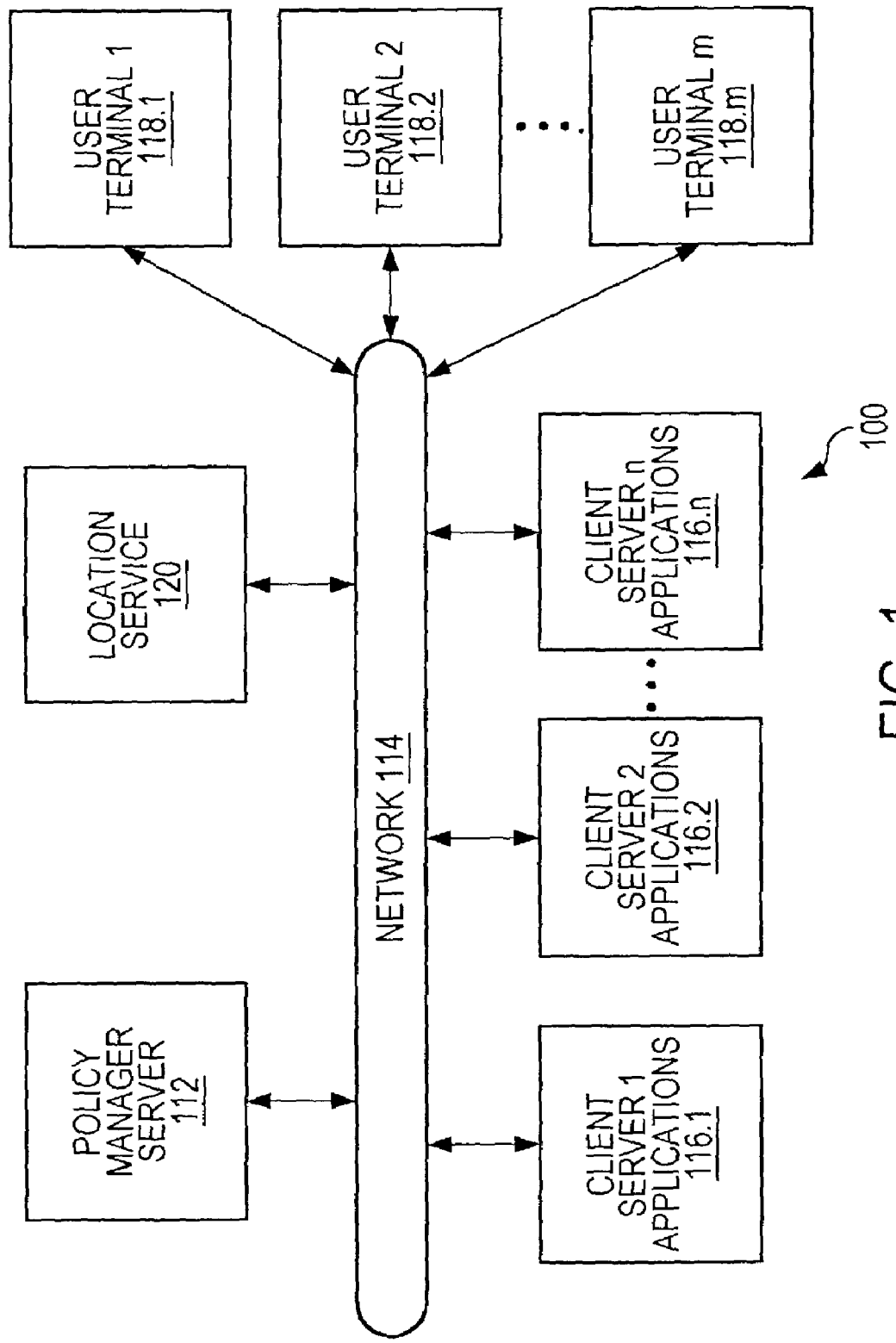
FIG. 1 is a block diagram of an exemplary system in accordance with the present invention.

FIG. 1 is a block diagram of an exemplary network system 100 in accordance with the invention. System 100 comprises a policy manager server 112, n client servers 116.1, 116.2, . . . , through 116.n, m user terminals 118.1, 118.2, . . . , through 118.m, and a location service 120. The policy manager server 112, n client servers 118.1, 118.2, . . . , 118.n, m user terminals 118.1, 118.2, . . . , 118.m, and location service 120 are coupled to each other through a network 114. Policy manager server 112 contains a global security policy that includes a plurality of policy rules and can distribute the various policy rules to the n client servers. Each client server 116 hosts various components or resources, stores a set of rules of the policy received through the network from policy manager server 112, and enforces the set of rules for components or resources. The set of rules received through the network is otherwise known as a local client security policy. Each user terminal 118 can access the components or resources hosted on one of the n client servers upon being granted access privileges based on the local client security policy stored in the client server. Location service 120 locates the components in system 100 based on the addresses registered with the location service.

Figure 1A:
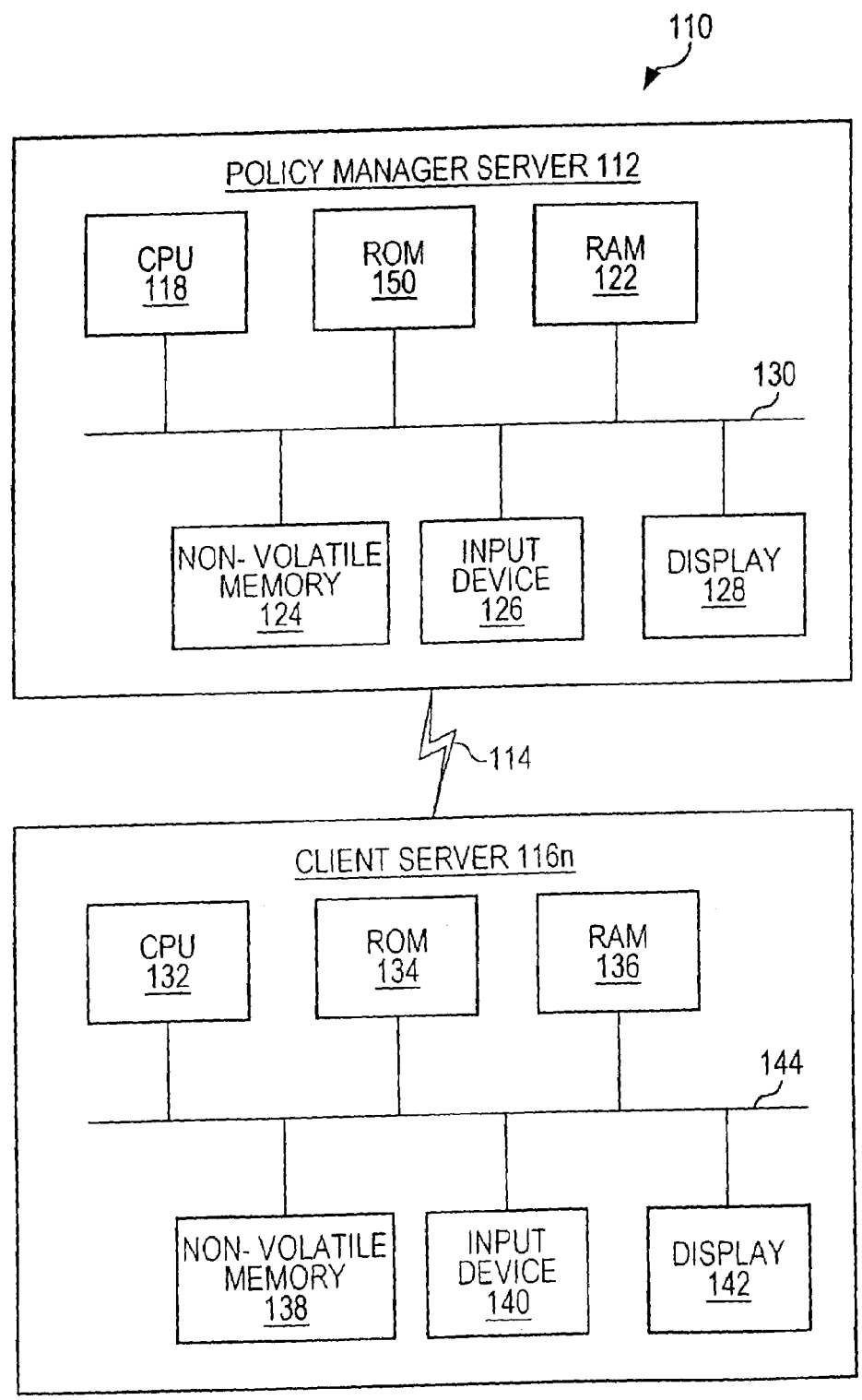
FIG. 1A is a block diagram illustrating further details of the system in FIG. 1, in accordance with the invention.

FIG. 1A is a block diagram of an exemplary network system 110, in accordance with the invention, illustrating one embodiment of network system 100 of FIG. 1. System 110 includes a policy manager server 112 connected via a network 114 to a client server 116.i (i=1, 2, . . . , or n). In the FIG. 1A embodiment, policy manager server 112 preferably includes a central processing unit (CPU) 118, a read-only memory (ROM) 150, a random-access memory (RAM) 122, a non-volatile memory 124, an input device 126, and a display 128 all connected via a bus 130.

Similarly, client server 116.i preferably includes a CPU 132, ROM 134, RAM 136, a non-volatile memory 138, an input device 140, and a display 142 all connected via a bus 144.

Policy manager server 112 preferably contains a program stored in non-volatile memory 124 for managing a global security policy or a set of rules related to whom, what and when access and the type of access to components of the system is granted. Then portions of the global security policy (i.e., the local client security policy) are distributed to client server 116.i via network 114. Client server 116.i preferably contains a program stored in non-volatile memory 138 for granting or denying access to various components or resources of client server 116.i, as specified by the local client security policy distributed from policy manager server 112. For example, various components or resources of client 116 can include applications, functions or procedures within an application, data structures within an application, and database or file system objects referenced by an application.

Figure 2:
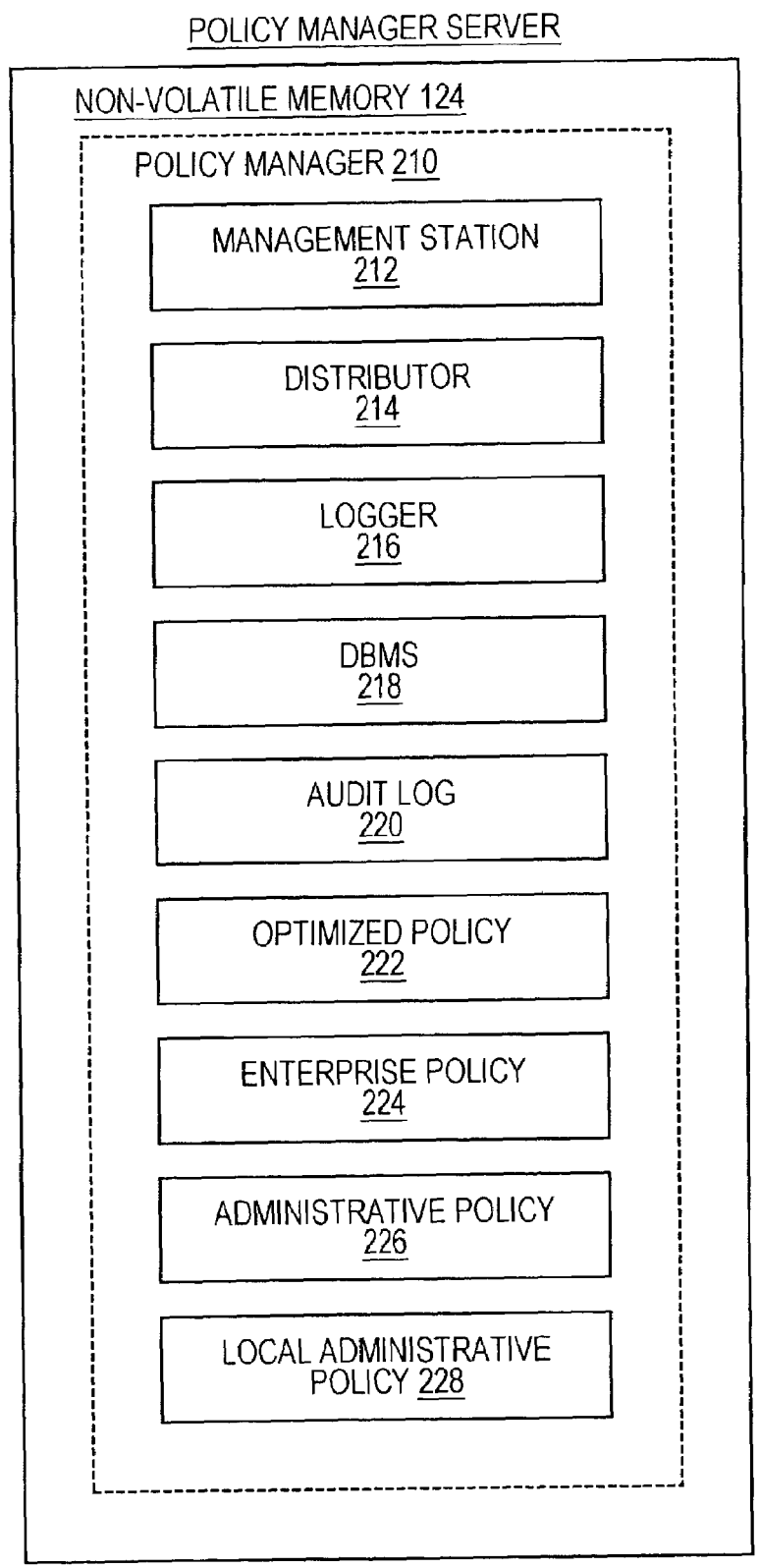
FIG. 2 is a block diagram of one embodiment of the non-volatile memory located within the server in FIG. 1A, according to the invention.
Figure 2A:
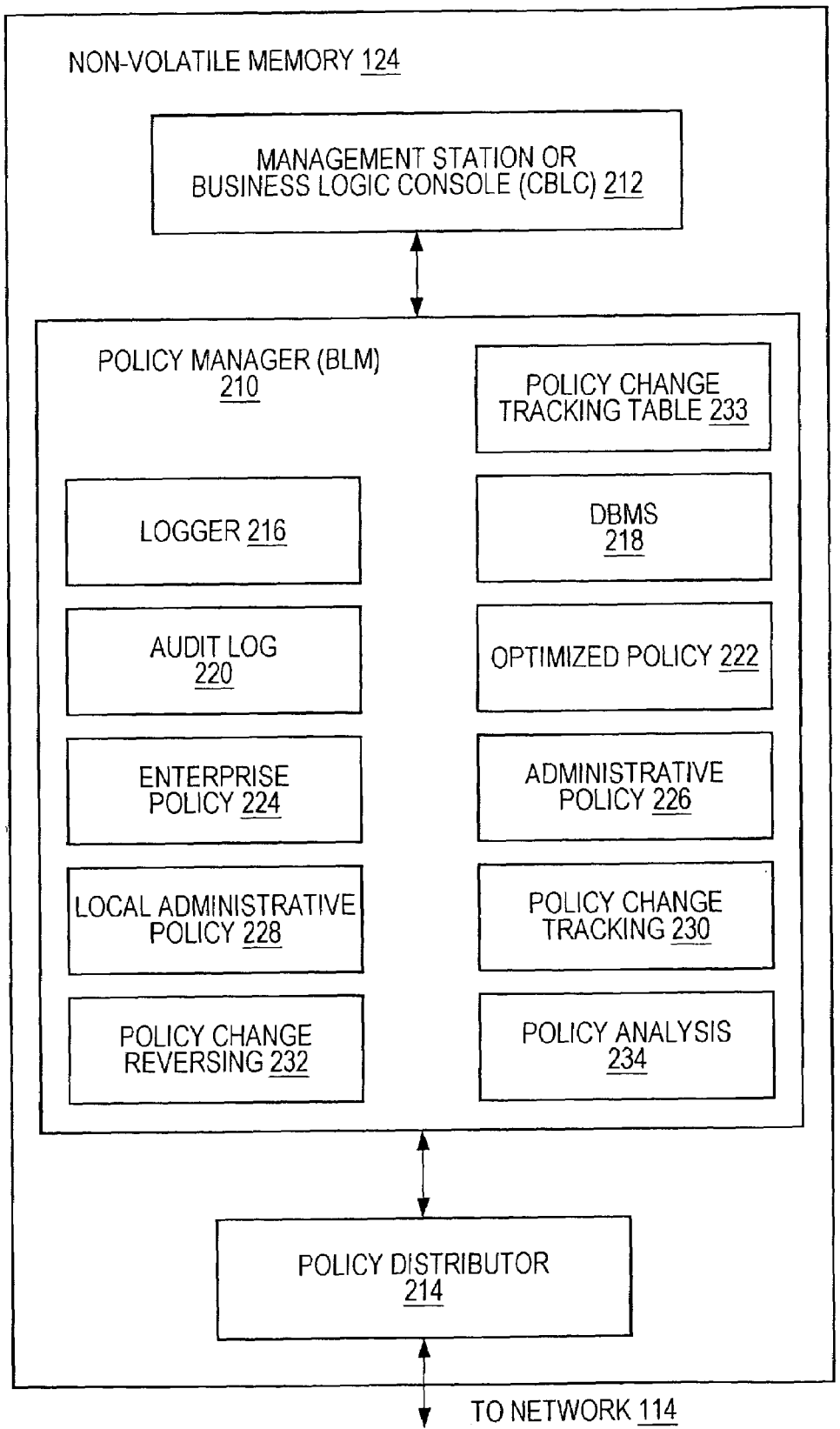
FIG. 2A is a block diagram of another embodiment of the non-volatile memory located within the server in FIG. 1A, according to the invention.

FIG. 2 is a block diagram of one embodiment for non-volatile memory 124, located within policy manager server 112 of FIG. 1A. FIG. 2A is a block diagram of another embodiment for non-volatile memory 124, located within policy manager server 112 of FIG. 1A. In the embodiments of FIGS. 2 and 2A, non-volatile memory 124 includes a policy manager (or business logic manager (BLM)) 210 that manages a global security policy, which is intended to specify the security requirements for applications and database objects across an entire enterprise. A global security policy may contain thousands of "security rules" that describe several constraints, including what applications a particular user can access, what objects (resources) within an application a user can access, and how those privileges are constrained by time, geography, attributes, application data or external events.

The system may have policy inquiry and verification features that enable administrators to review and report on a global or local client security policy, identifying inconsistencies and entitlements that violate corporate policy and regulations. The policy inquiry and verification facilitate reconciling the user's experience and workflow.

The policy inquiry and verification may allow users to ask questions about how a policy will respond to specific access requests. Users can ask about contradictions in a given security policy for a user or group of users. Users' access to policy information is authenticated by a policy manager (or BLM) or an application guard (or BLE) against the global or local client security policy, as the case may be, enforced by policy manager 210 or application guard 310. The policy inquiry and verification features allow users to find out what a user's authorization policy is, which applications a user can access, the authorization policy for a specified user in a specified application, which rules indirectly reference a specified user, which rules give a specified entitlement, and which users have rights to specified privilege/object sets.

An authorization policy preferably comprises four components, including objects, subjects, privileges, and conditions. Objects may be applications, or the operations within an application. Examples of objects include applications or methods, web pages, database tables or files, and menu items in a graphical user interface. The granularity of objects has a direct impact on the level of security achieved. The less information an object contains, the less likely it is that a user has access to information not needed to perform his job function. On the other hand, the granularity of objects should be balanced against the case of security management. The more information an object contains, the fewer the objects that have to be protected, and the smaller the security policy.

Objects are preferably organized into an object hierarchy. If an object represents an application, then its children objects might represent the methods used with the application. Similarly, if an object represents a database, then its children objects might represent the tables and views within the database.

If a user is granted a certain privilege on a parent object, then he is automatically granted the privilege on all the children objects. Similarly, if a user is denied a certain privilege on a parent object, then he is automatically denied the privilege on all the children objects. In other words, privileges are inherited from parent to children objects. Privilege inheritance through the object hierarchy eases security management because rather than granting the same privilege to every child object, the privilege is granted once to the parent object, and if the privileges of an object change, the policy on all the children objects automatically reflects the changes made to the object.

Subjects may be users, or roles containing users, who access protected objects. Subjects correspond to users that have access to information in a system. Users can either be internal or external to a system. Users are authorized to access information in order to perform their job functions. Such access may be controlled so that a user gets access only to the information needed to perform his job function.

Alias users may also be supported. An alias of a user is another user who, under certain conditions, inherits all the privileges of the user. Aliases facilitate authorization management by providing fine granularity of control on the propagation of privileges. For example, an alias of a user can be created to perform his job function while he is absent. The inheritance of privileges takes effect only when the user is absent. An alias implements the business requirements of delegation, where the privileges of a user can be delegated to another user under certain conditions. Conditional inheritance of privileges through an alias reduces the burden of security management, because it restricts privilege propagation to situations when certain conditions are satisfied.

A securable component or object is selected from a group including at least one application, a function within an application, a procedure within an application, a data structure within an application, a database object referenced by an application, or a file system object referenced by an application.

Users of an object may be defined as being local to that object. In a typical system, the same user is often represented by different login identifications in different objects. This system may support the notion of a "global" user to capture this situation. Every global user is mapped to a set of local users, one per object. Global users facilitate the centralized management of users throughout the system, even if they are identified by different names in different objects.

A privilege defines the kinds of access that may be allowed to objects. In the preferred embodiment, a privilege is the right to perform a particular action on a specific object. The kinds of privileges that apply to an object depend on the type of the object. Examples of privileges include the right to execute an application, the right to download a web page, the right to query a database table, and the right to view a menu item.

Privileges are granted to users so they can accomplish tasks required for their jobs. A privilege should be granted to a user only when it is absolutely required for the user to accomplish a task. Excessive granting of unnecessary privileges may lead to compromised security. A user may receive a privilege in two different ways. Privileges can be granted to users explicitly (for example, user SMITH can be granted the privilege to execute the payroll application), or privileges can be granted to a role (a named group of privileges), which is then granted to one or more users (for example, a role named "clerk" can be granted the privilege to execute the payroll application, and user SMITH can be granted the clerk role).

Roles are named groups of privileges that are granted to users or other roles. Users granted a role are the members of that role. A role is often used to represent the set of privileges needed to perform a job function.

The members of a role automatically inherit all the privileges granted or denied to the role. In addition, roles may be organized into a role hierarchy where parent roles are granted to children roles. If a parent role is granted a privilege, then the children roles are automatically granted the privilege. Similarly, if a parent role is denied a privilege, then the children roles are automatically denied the privilege.

Roles of an object may be defined as being local to that object. In a typical system, the same role is often represented by different names in different objects. This system may support the notion of a "global" role to capture this situation. Every global role is mapped to a set of local roles, one per object. Global roles facilitate the centralized management of roles throughout the system, even if they are identified by different names in different objects.

Role membership may be further constrained by the notion of mutual exclusion. Two roles are mutually exclusive if no single user can be granted both roles simultaneously. Role mutual exclusion implements a business requirement of separation of duty. For example, a submit_budget role and an approve_budget role should be mutually exclusive, because no user should be simultaneously authorized to perform both actions.

In a typical security policy, there are preferably two types of access rules, a grant rule and a deny rule. A grant rule states that a privilege on an object is granted to a subject under an optional constraint. A deny rule states that a privilege on an object is denied to a subject under an optional constraint. Additionally, a wild card "any" may be used as a privilege, object, or subject, meaning that any legitimate value could be substituted in its place.

An access request preferably contains a privilege, an object, and/or a subject, representing the fact that the subject requests authorization of the privilege on the object. An access request matches a grant rule if the privilege, object, and subject match those in the rule, and the constraint in the rule evaluates to "true." An access request matches a deny rule if the privilege, object, and subject match those in the rule, and the constraint in the rule does not evaluate to "false."

An access request is denied if there is a deny rule matching the request, or there are no access rules matching the request. An access request is granted if there are no deny rules matching the request, and there is an access rule matching the request.

Conditions define the constraints on when objects and subjects can be accessed. The constraints in an access rule specify further requirements on when the access rule is applicable. These requirements could be conditioned on properties of the object or the subject.

Constraints are preferably expressions formed from conditions and operators. These may include, but are not limited to, the Boolean operators NOT, AND, and OR, and the relational operators=, < >, <, <=, >, >=, LIKE, and NOT-LIKE, and the set operators IN and NOTIN.

In addition to built-in conditions, users of system 110 may declare custom evaluation functions, which are customer-defined conditions. System 110 may provide an API for invoking customer-supplied code to evaluate custom evaluation functions. For example, an evaluation function could access a remote database to validate certain properties of the object. Another evaluation function could invoke an external server to authenticate the subject.

Referring to the FIG. 2 embodiment, policy manager (or business logic manager (BLM)) 210 preferably includes a management station (or business logic console (BLC)) program 212 to operate policy manager 210, a distributor program 214 to distribute local client security policies to clients or client servers 116, a logger program 216 to track authorization requests, and a database management system (DBMS) 218 to maintain policy data files. Policy manager 210 also includes an audit log data file (database) 220 to record authorization requests, an optimized policy data file (database) 222, an enterprise policy data file (database) 224, an administrative policy data file (database) 226, and a local administrative policy data file (database) 228. The contents and operation of policy manager 210 are further discussed below in conjunction with FIGS. 4, 8, 9, 10, 11, and 12.

Referring to the FIG. 2A embodiment, non-volatile memory 124 of FIG. 1A includes a management station or business logic console (BLC) program 212, a policy manager (BLM) 210 coupled to BLC 212, and a policy distributor 214 coupled to BLM 210. Policy manager 210 preferably includes a logger program 216 to track authorization requests, and a database management system 218 to maintain policy data files, an audit log data file (database) 220 to record authorization requests, an optimized policy data file (database) 222, an enterprise policy data file (database) 224, an administrative policy data file (database) 226, and a local administrative policy data file (database) 228. Policy manager 210 further includes policy change tracking 230, policy change reversing 232, policy change tracking table 233, and policy analysis (engine) 234.

Figure 3:
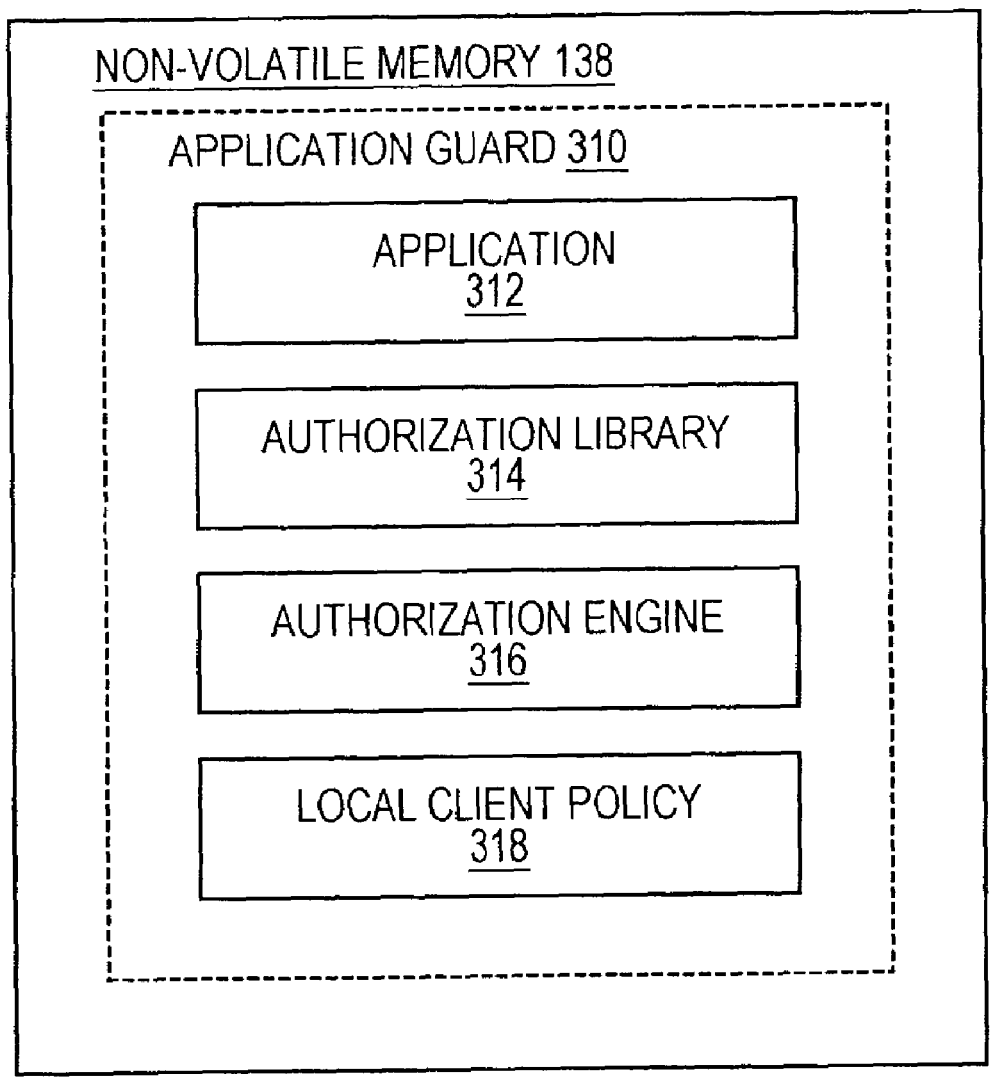
FIG. 3 is a block diagram of one embodiment of the non-volatile memory located within the client in FIG. 1A, according to the invention.

FIG. 3 is a block diagram of one embodiment for non-volatile memory 138, located within client server 116 of FIG. 1A. In the FIG. 3 embodiment, non-volatile memory 138 preferably includes an application guard 310 that grants or denies access to various securable components of client or client server 116, as specified by the relevant local client security policy. For example, various securable components of client server 116 can include applications, data, and/or objects. In the FIG. 3 embodiment, application guard 310 preferably includes at least one application 312, an authorization library program 314, an authorization engine (or business logic engine (BLE)) 316, and a local client security policy (data file or database) 318.

Figure 3A:
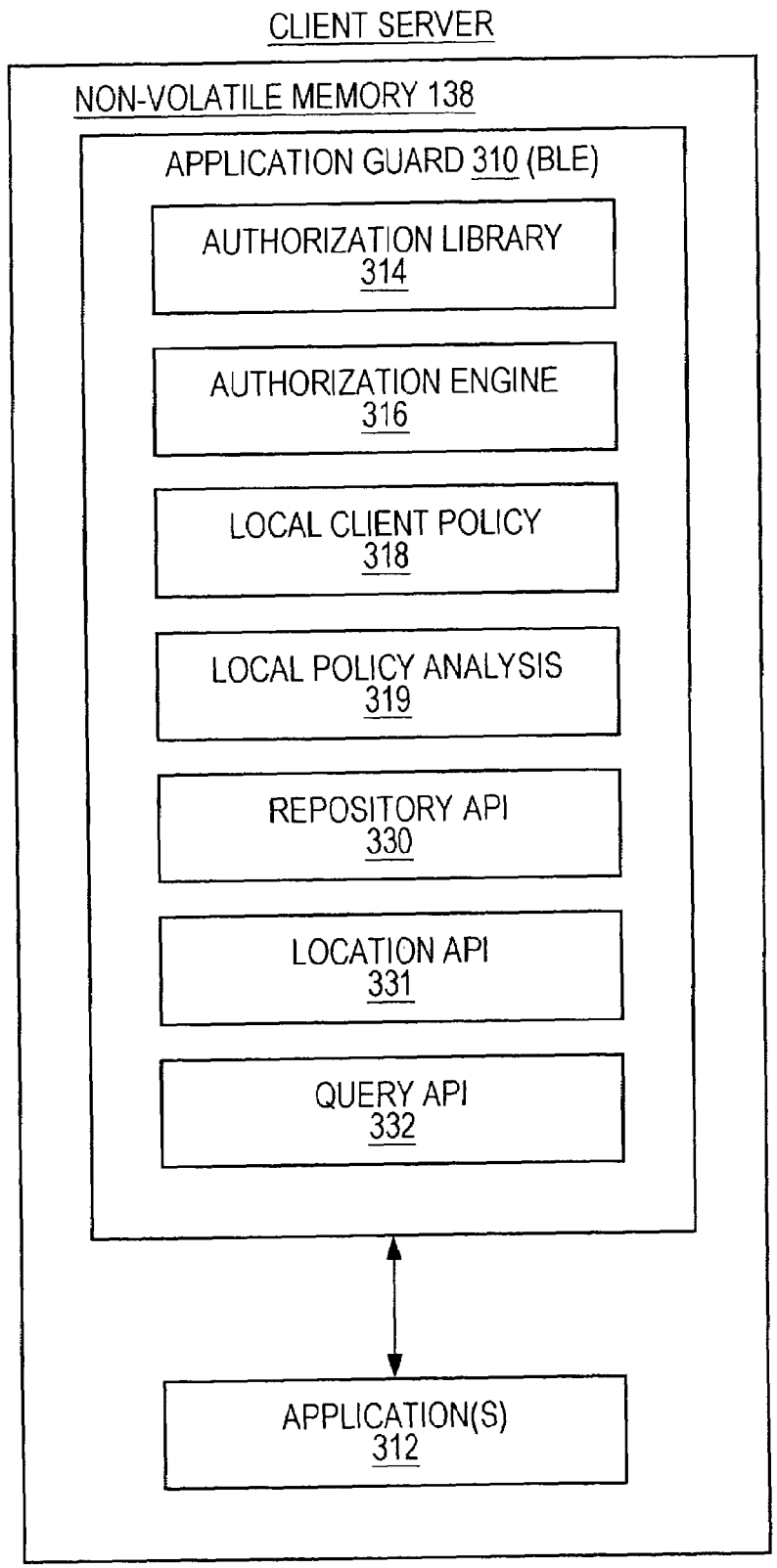
FIG. 3A is a block diagram of another embodiment of the non-volatile memory located within the client in FIG. 1A, according to the invention.

FIG. 3A is a block diagram of another embodiment for non-volatile memory 138, located within client server 116 of FIG. 1A. In the FIG. 3A embodiment, non-volatile memory 138 preferably includes an application guard 310 and at least one application 312. In the FIG. 3A embodiment, application guard 310 preferably includes an authorization library program 314, an authorization engine (or business logic engine (BLE)) 316, a local client security policy (database) 318, a local policy analysis (engine) 319, and three application programming interfaces 330, 331, 332. Repository API 330 communicates with a policy repository to receive policy updates. Location API 331 is for registering Application Guard 310 with a location service to facilitate communication with the guard. Interfaces 330 and 331 make up interface 520, and interface 332 represents interface 512, in FIG. 5. Authorization engine 316 grants or denies access to securable components of client server 116, as specified by the set of rules in the local client security policy, which is stored in local client policy (database) 318. For example, securable components of client server 116 can include applications, data, and/or objects.

Figure 4:
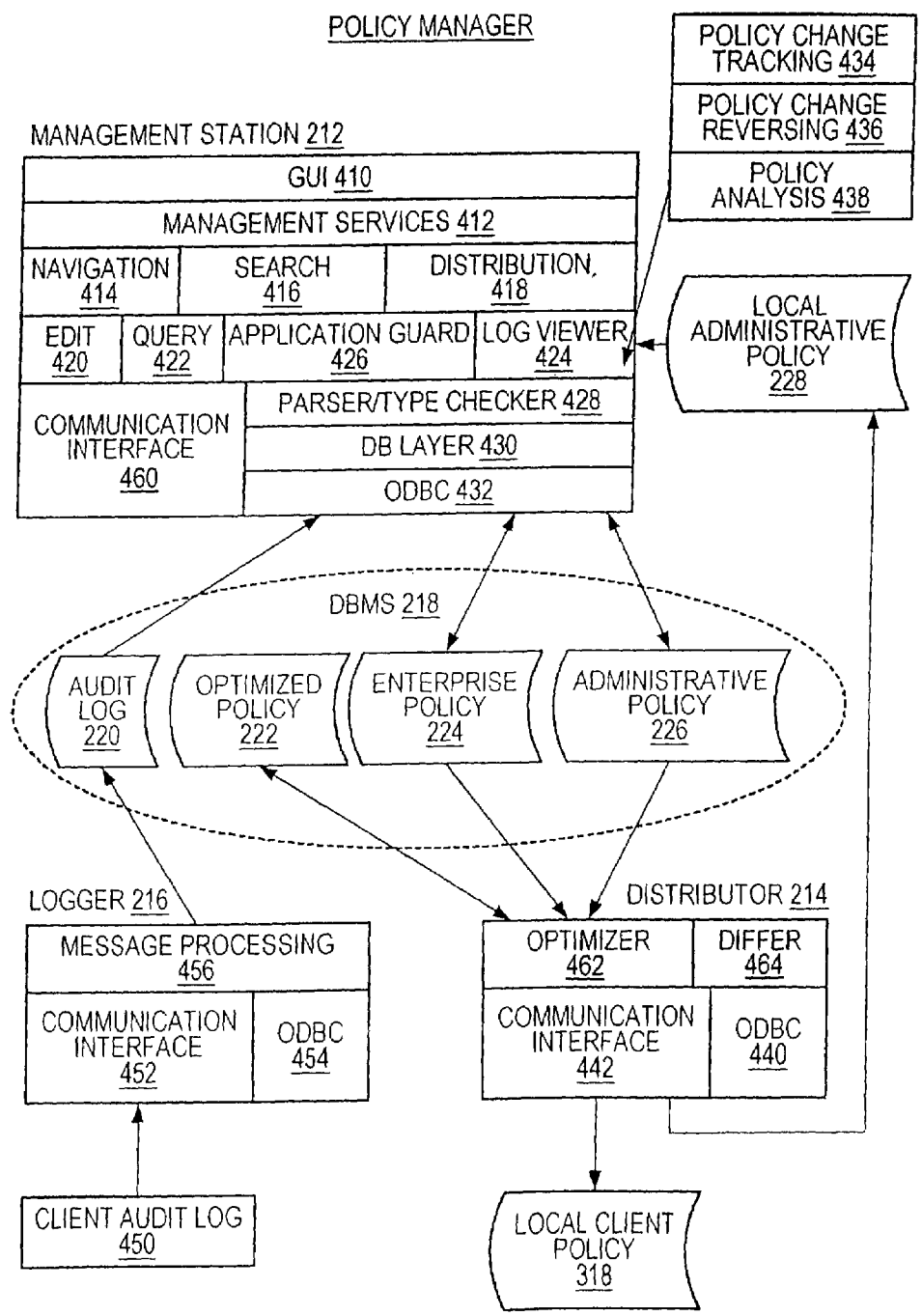
FIG. 4 is a block diagram of one embodiment of the policy manager located within the non-volatile memory in FIG. 2, in accordance with the invention.

FIG. 4 is a block diagram of one embodiment of policy manager 210, located within non-volatile memory 124 in FIG. 2. In the preferred embodiment, policy manager 210 allows system users to implement, analyze, edit and update a centrally managed enterprises or global security policy 224. In the FIG. 4 embodiment, policy manager 210 preferably includes a business logic console (BLC) or management station 212, a database management system 218, an audit facility or logger 216, and a distributor 214.

In the FIG. 4 embodiment, management station 212 preferably includes a graphical user interface (GUI) 410 for users to create or customize policy rules. Management station 212 supports concurrent policy rule development by multiple users. Each policy rule preferably includes four basic components: 1) an object that is to be protected; 2) an access right or privilege; 3) a global or local user to which the privilege applies; and 4) conditions under which the privilege is granted or denied, including built-in access criteria, such as time of day or location, as well as custom-defined access criteria.

Graphical user interface 410 provides a user-friendly set of menu options or management services 412 to fully operate policy manager 210. Programs controlled by the menu options may include navigation 414, search 416, distribution 418, edit 420, query 422, log viewer 424, policy change tracking 434, policy change reversing 436, and policy analysis 438. As an alternative to the GUI 410, the management services can be operated from an application 312, through an API, that allows programs to perform the same functions as a human operator. In the preferred embodiment, management station 212 also includes an application guard 426 to allow only authorized administrators to operate management station 212. Local administrative policy 228 provides a set of policy rules specifying which users are authorized to access management station 212.

After the policy rules that form a local client policy are created or modified using management station 212, they may then be distributed to appropriate client servers 116 (FIG. 1A). Management station 212 includes a communication interface 460 in order to pass information between various other components in system 110.

Prior to the policy rules being distributed, a parser/type checker 428 preferably reviews and reconstructs the policy rules to make sure that they are syntactically and semantically correct according to a predefined policy language. The policy rules pass through a database layer (DB layer) 430 and a database connectivity layer such as Open Database Connectivity (ODBC) 432 before being stored as part of the global security policy 224. DB layer 430 formats the policy rules into standard database storage tables, and a database connectivity layer such as ODBC 432 provides a common interface to various vendor-specific databases.

Global security policy 224 is passed to distributor 214 once the policy has been updated to incorporate the created or modified policy rules. An optimizer program 462 within distributor 214 then determines which application guard 310 needs to receive which policy rules (based on the local client security policy stored in each application guard). A differ program 464 determines what types of changes were made to optimized policy 222, and then distributes only changes to the relevant policy rules (or local client security policy 318) through a database connectivity layer such as ODBC 440 and a communication interface 442 to the appropriate application guard 310 (FIG. 3), which enforces access control to local applications 312 and data.

Since the application guards 310 can be distributed among various clients or client servers 116, and each application guard 310 has its own specific local client security policy 318, the system provides scalability.

Distributor 214 (FIG. 2) may also be used to optimize administrative policy 226 into an optimized administrative policy or local administrative policy 228 for use with application guard 426 in management station 212.

Figure 5:
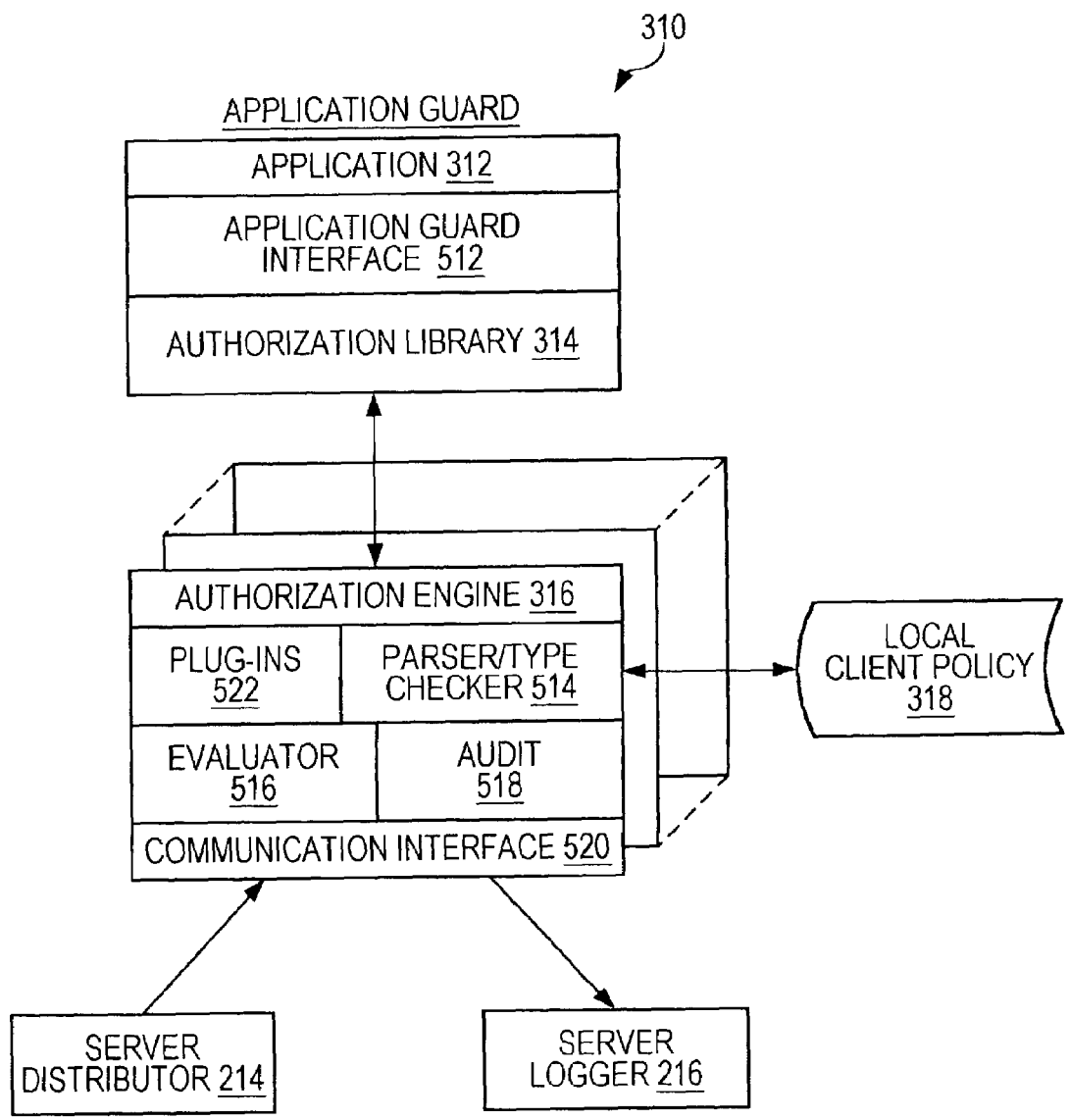
FIG. 5 is a block diagram of one embodiment of the application guard located within the non-volatile memory in FIG. 3, according to the invention.

FIG. 5 is a block diagram of one embodiment of application guard 310, located within non-volatile memory 138 in FIG. 3. Application guard 310 may be distributed on multiple client servers 116 throughout an enterprise and is designed to reside along with a protected application 312, such that each protected application throughout an enterprise has an associated application guard 310.

Users have the option of implementing application guard 310 locally to application 312, as a service running on the same system as application 312, or as a remote authorization service through a remote procedure call to another server. The advantage of the latter design would be to offload the application server from handling authorization services or allowing a single client server 116 to handle a multiple number of applications 312. A local implementation would provide maximum performance and minimize any network traffic overhead.

As seen in FIG. 5, application guard 310 includes an application guard interface 512 (referred to as interface 332 in FIG. 3A), coupled to an application 312, for requesting access to securable components. Application guard 310 also includes at least one authorization engine 316 for evaluating requests from application guard interface 512 as specified by local client security policy 318. Multiple authorization engines 316 can be used for added performance and reliability. Furthermore, application guard interface 512 can be located on a client computer, while authorization engine 316 and local client policy 318 can be located on client server 116.

The design and architecture of application guard 310 separate the local client security policy from a given protected application and impose virtually no performance overhead on an existing application 312. Further, this structure enables requests to access the protected application to be evaluated by reviewing only the relatively few policy rules that make up the local client security policy rather than by reviewing the much larger set of policy rules forming the global security policy. In addition, the policy rules developed at policy manager 210 are compiled into an optimized form before changes to the sets of policy rules forming the various local client security policies are distributed to the target application guards 310. The optimized form enables the distribution of only the modified portions of the various local client security policies to the target application guards 310. This distribution methodology, among other things, facilitates updating the versions of the local client security policies enforced by the application guards 310.

Figure 6:
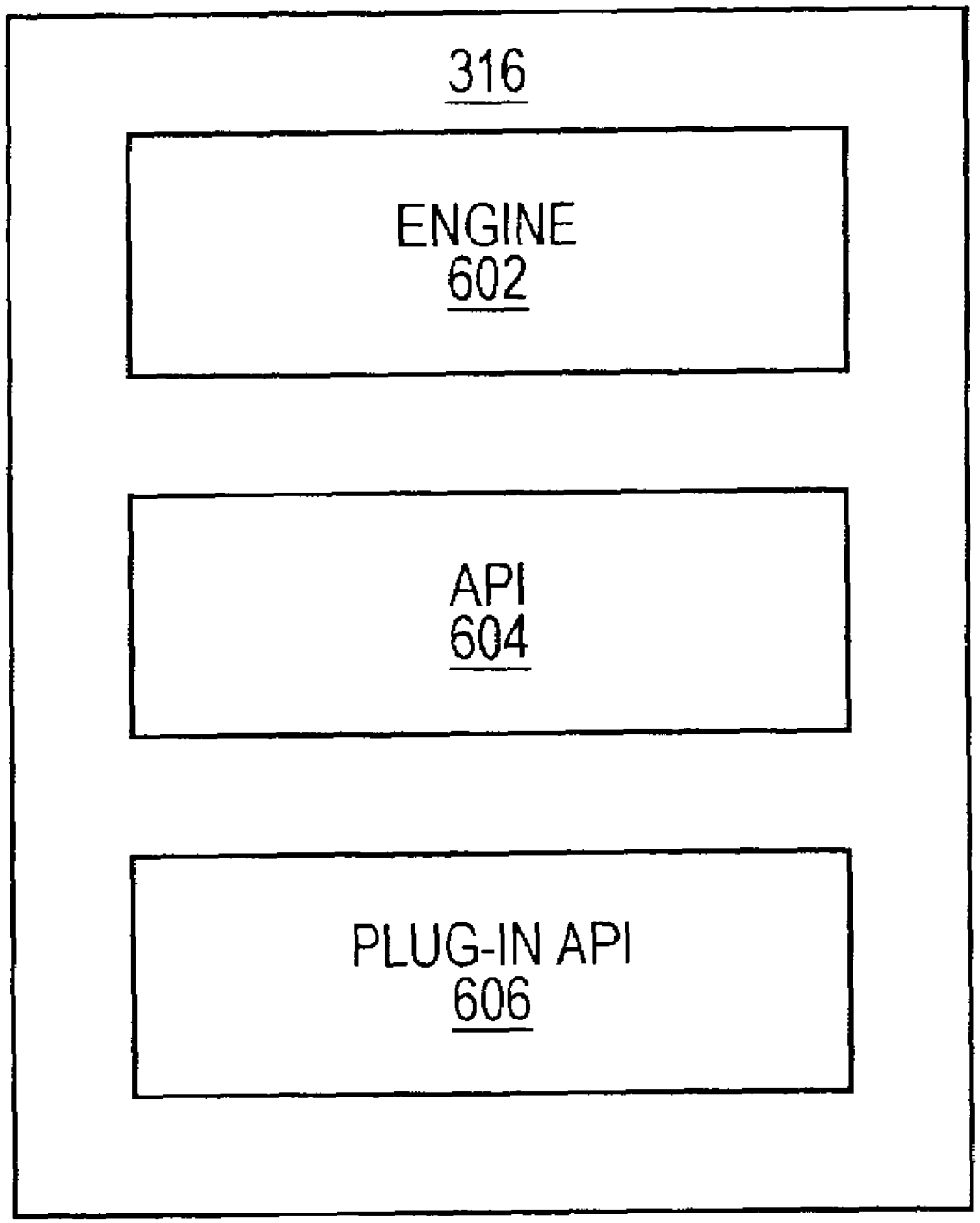
FIG. 6 is a block diagram of a business logic engine (BLE)

FIG. 6 is a block diagram of BLE 316 including an engine 602, an API 604, and a plug-in API 606. Engine 602 is the active component of a BLE, which maintains and evaluates entitlement information for application(s). API 604 provides a link between the application(s) and BLE 316. Plug-in API 606 extends an application guard's 310 or BLE's 316 capabilities, such as enabling the system to interface with one or more applications written in languages other than the one for which API 604 was written.

Application guard 310 supports transactional access control by allowing an application 312 to interface with a local client security policy and to make authorization requests at each and every user interaction, data request, or business-level transaction. The application guard is capable of evaluating the complete local client security policy and making an authorization decision outside of the application. No policy rules need to be embedded in the application or its associated databases. In addition, the design and integration of application guard 310 is fundamental to providing access control to business-level objects within an application 312 since the local client security policy accounts for those named policy objects within the application 312.

In the FIG. 5 embodiment, application guard 310 is preferably integrated with application 312 through a high-level application programming interface (API) or authorization library 314 that allows application 312 to make authorization requests as needed through an application guard interface 512. Typically, this can be done quickly by including the authorization requests at key points in application 312 for control of user interaction or database access so that each interaction is protected with a minimum amount of development.

Figure 7:
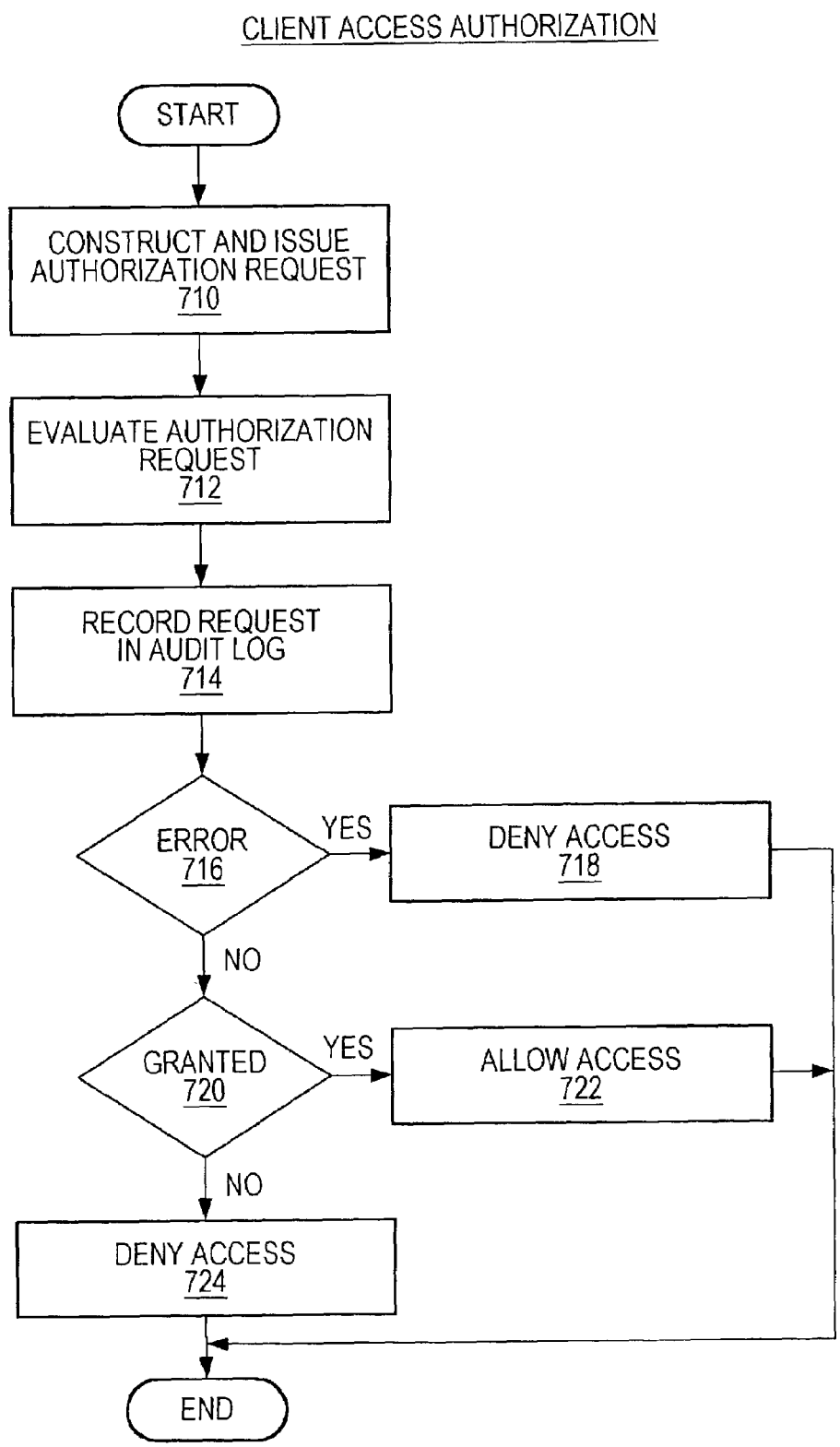
FIG. 7 is a flowchart illustrating an exemplary process for a client access authorization.

The FIG. 7 example for a user using a standard application guard 310 begins with the user at a user terminal 118 (FIG. 1) requesting access to a securable component protected by an application guard 310. In step 710, application guard 310 constructs and issues an authorization request. At step 712, the authorization request is evaluated by application guard 310 according to its local client security policy 318 to determine whether to allow or deny the authorization request. At step 714, audit 518 records the authorization request in audit log 450. Next, at step 716, if there is an error in the authorization request, or if the request is not valid, then at step 718 the user is denied access. However, if the authorization request is valid, then at step 720 it is determined whether access should be granted. If the evaluated authorization request does not deny access for the user, then at step 722 access is allowed. If the evaluated authorization request denies access for the user, then at step 724 access is denied.

Figure 8:
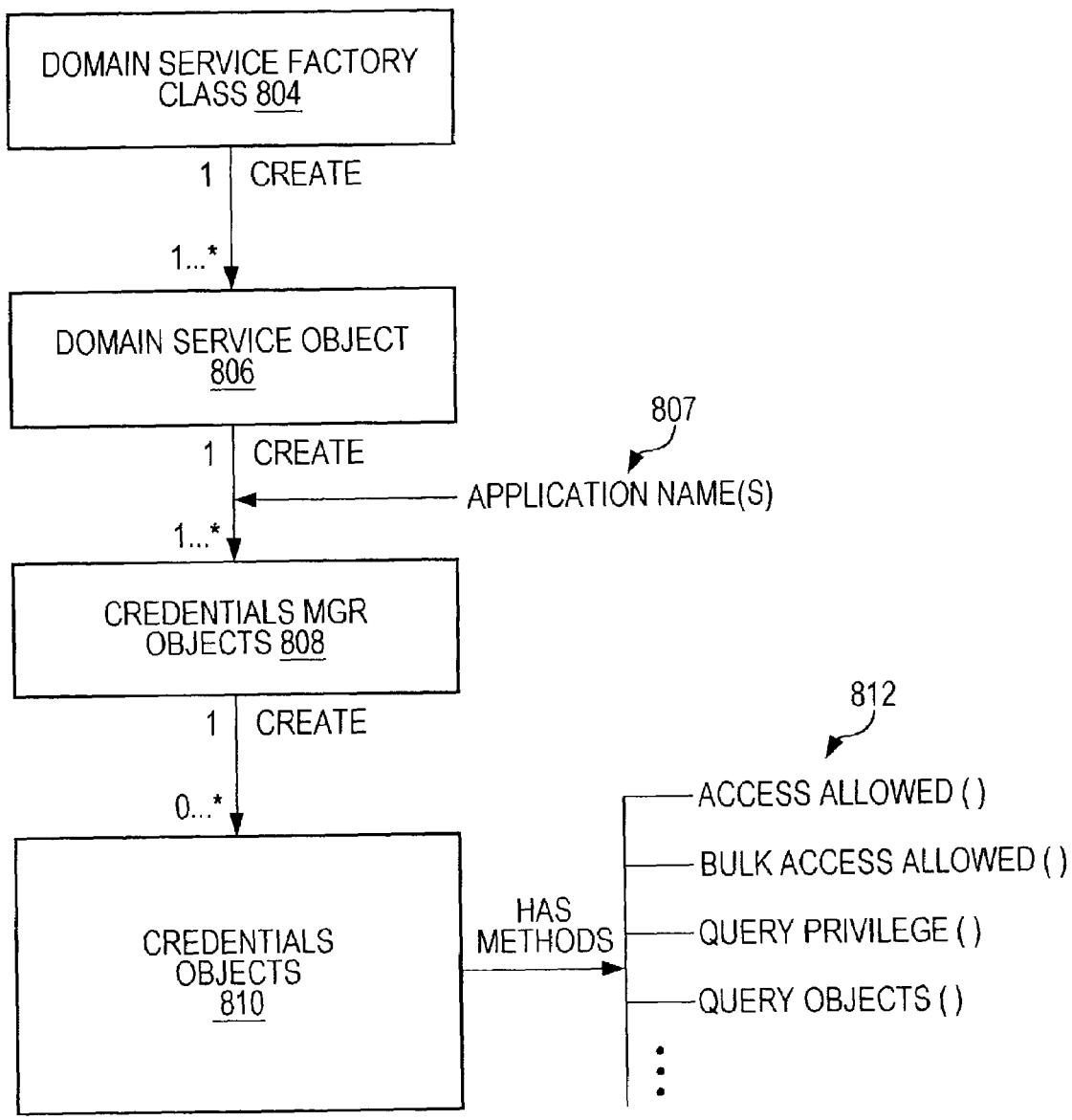
FIG. 8 is a class diagram illustrating an exemplary subset of components in a business logic engine application programming interface (BLE API)

API's necessary for externalizing rule management preferably include a set of interfaces for rule repository update, a set of interfaces for locating an authorization engine 316, and a set of interfaces for submitting authorization queries. FIG. 8 is an exemplary class diagram containing a subset of major components in the exemplary BLE API's 331 and 332 in FIG. 3A, where Domain Service Factory class 804 is a root interface for locating authorization engines 316, submitting authorization queries, and a factory for creating Domain Service objects 806. In response to a given application name, Domain Service objects 806 discover Credentials Manager object 808, which provides Credentials object 810 that enables authorization queries to the authorization engine. Operations on the Credentials interface allow efficient querying of authorization engine. Each Credential object 810 has several methods 812, including Credentials.accessAllowed method, Credentials.bulkAccessAllowed, Credentials.queryPrivilege method, and Credentials.queryObjects. The Credentials.accessAllowed method is a basic authorization query method and the Credentials.bulkAccessAllowed method is an optimized authorization query method that allows multiple queries in one call. Other Credentials object methods allow more complex queries to the authorization engine. The Credentials.queryPrivilege method allows for querying of privileges for the specific user and object combination. The Credentials.queryObjects method allows for querying of objects for which a specific user has been granted certain privileges. Application guard interface 512 includes methods to apply each specific policy delta and methods to either apply or reject a policy update. Exemplary interfaces and their methods can be found in Appendix A.

A global security policy, in practice, involves constant changes, such as environmental, organizational, operational, and IT structural changes. As a result, the global security policy, which spans an entire enterprise, needs to be frequently updated, which involves complications as discussed in the Background Section. Changes in the security policy can be large or small, but any effective system for implementing a global security policy must quickly distribute those changes, through the network, to the relevant application guards 310. Therefore, the invention includes a schema for quickly distributing accumulated incremental policy changes throughout a network.

Figure 9:
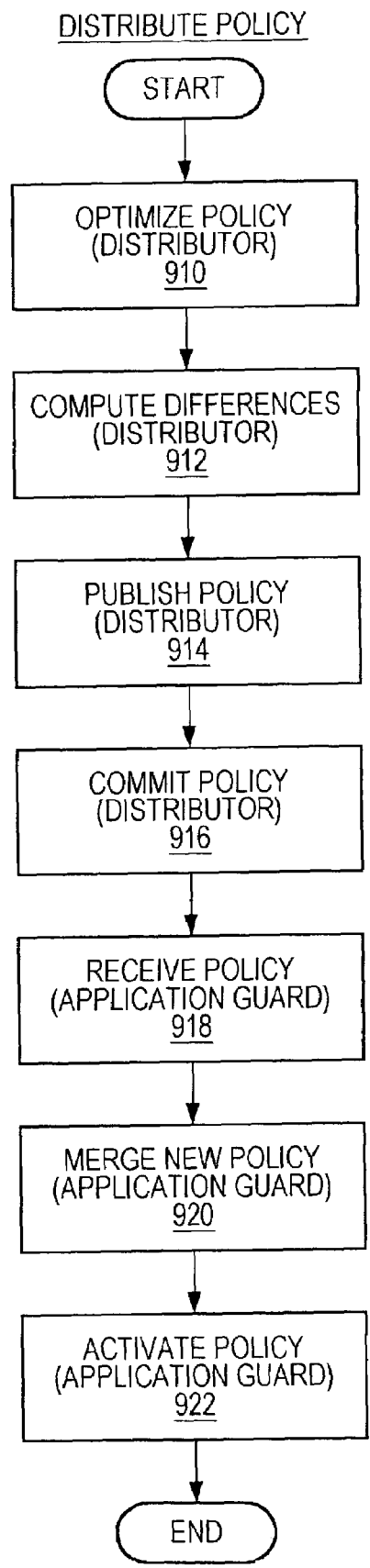
FIG. 9 is a flowchart illustrating an exemplary menu option to distribute changes to a local client security policy.

FIG. 9 is a flowchart illustrating an exemplary menu option to distribute a policy. After enterprise policy 224 has been initially entered or modified in any way, the modified features of enterprise policy 224 may be distributed to appropriate application guards 310. At step 910, upon selecting the distribute policy option, distributor 214 optimizes enterprise policy 224. Then at step 912, differ 464 preferably computes any difference between the newly optimized policy and optimized policy 222. At step 914, the newly optimized policy is published as optimized policy 222 in DBMS 218. Next, at step 916, only the changed portions of optimized policy 222 are committed to appropriate application guards 310. At step 918, application guards 310 receive the changed policy, and then at step 920 application guards 310 merge the changed policy into local client policy 318. Next at step 922, new local client policy 318 is activated to work with application guard 310.

Figure 10:
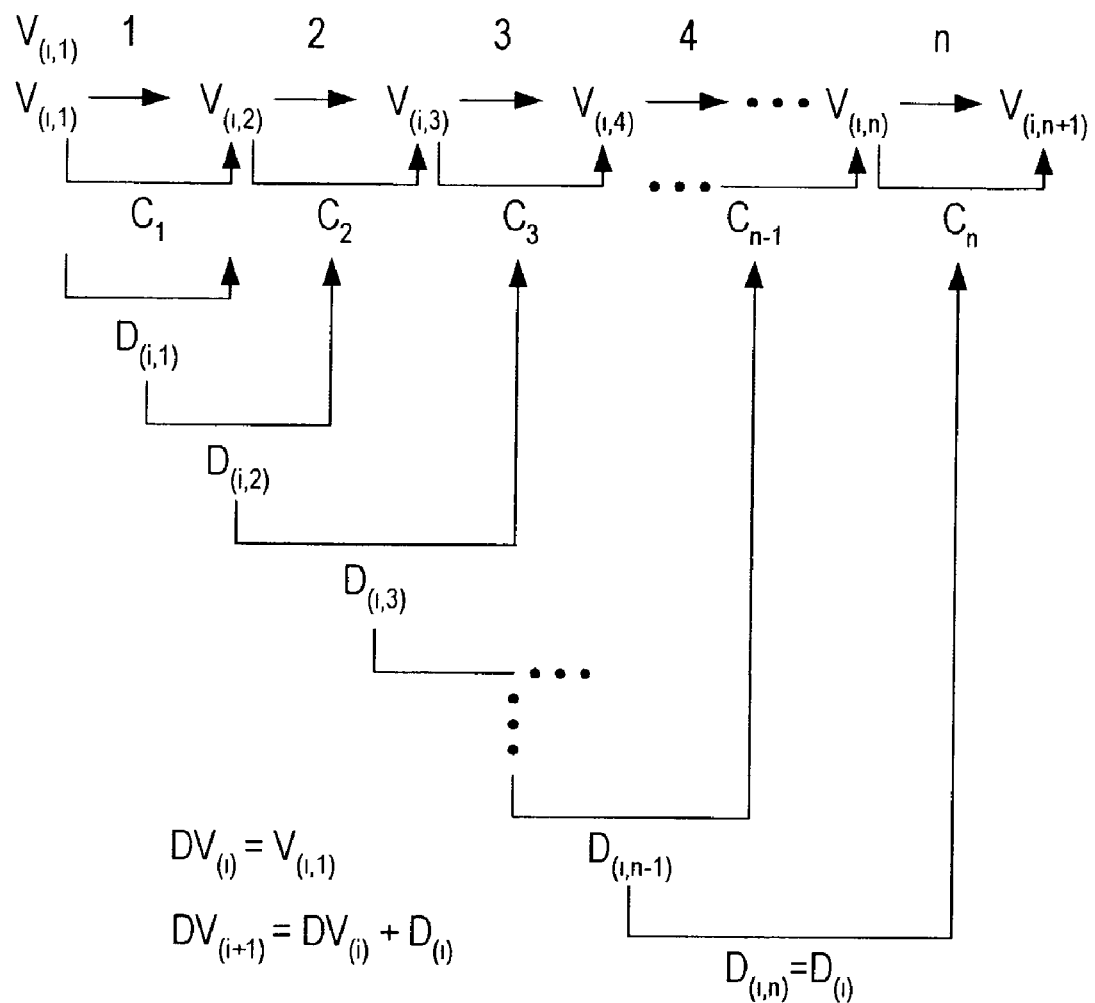
FIG. 10 shows the principle of distributing, through a network, accumulated incremental changes to a local client security policy, in accordance with the invention.

FIG. 10 shows the principle of distributing accumulated incremental policy changes throughout a network, in accordance with the invention. In the formula below, DV stands for distributed version, C for change, and D for computed delta (or difference). The currently enforced version of the local client security policy, after the $i^{th}$ occurrence of accumulated incremental policy change distribution, on a client server 116 (FIG. 1) is denoted as DV(i) (or DV(i, 1)), which is stored in enterprise policy (database) 224 (FIG. 2A) and local client policy (database) 318 (FIG. 3A). The second index (k, as in DV(i, k)) denotes the change number after the $i^{th}$ distribution and before the next distribution, starting with 1 (no change yet). A sequence of n incremental changes are made to the currently enforced version of the local client security policy, DV(i, 1), resulting in a sequence of intermediate policy versions in an order of V(i, 2), V(i, 3), V(i, 4), . . . , V(i, n), and V(i, n+1). An incremental change Ck (k=1, 2, . . . , n) is associated with two adjacent policy versions V(i, k) and V(i, k+1). For example, an incremental change C3 is associated with two adjacent policy versions V(i, 3) and V(i, 4). Each incremental change Ck may include one or more rule changes in a policy, including adding rules, deleting rules, and/or amending rules, or any other policy change. Corresponding to the n incremental changes, a sequence of n computed deltas will be generated in an order of D(i, 1), D(i, 2), D(i, 3), . . . , D(i, n−1), and D(i, n). A computed (or accumulated) delta D(i, k) (k=1, 2, . . . , n) accumulates all the policy changes that have been made in the previous incremental changes up to the Ck. In other words, the accumulated delta, D(i, k), accumulates all policy changes in Ck, Ck−1, . . . , C2, and C1. For example, D(i, 3) accumulates all changes in C3, C2 and C1. The accumulated policy changes may simplify the final result in a sequence of incremental changes. For example, if a policy rule is added into one incremental change and later deleted from another increment change; or if a policy rule is deleted from one incremental change and later added into another increment change, these two changes will offset each other.

At the $n^{th}$ incremental change Cn, if local client security policy version V(i, n+1) is satisfactory to a user, a policy distributor 214 (FIG. 2A) will transmit D(i, n) or D(i) to client server 116 (FIG. 1A), which will update the currently enforced version of the local client security policy, DV(i), based on D(i). By pre-computing and distributing only finally accumulated changes, (i.e., the accumulated delta)

D(i), the invention reduces network congestion and distribution time to update a currently enforced local client security policy. After distributing D(i), the currently enforced policy is changed from version DV(i) to version DV(i+1) at the client server, that is, DV(i+1)=DV(i)+D(i).

In the process of generating the new version of the enforced local client security policy, DV(i+1), policy change tracking 230 (FIG. 2A) keeps track of the incremental changes C1, C2, . . . , Cn−1, Cn, computes respective deltas D(i, 1), D(i, 2), . . . , D(i, n−1), D(i, n), and stores Ck, D(i, k), where k=1, 2, . . . , n−1, n, in policy change tracking table 233 (FIG. 2A). Policy change tracking 230 also stores the new version of the enforced local client security policy, DV (i+1), to enterprise policy (database) 224 (FIG. 2A).

To illustrate an application of the principle shown in FIG. 10, a process is provided to show that in a currently enforced policy version DV(i)=V(i, 1), a user ID name "user_a" is renamed to "user_f" in a sequence of n incremental changes, where:

V(i, 1)+C1 (renaming user_a to user_b)=V(i, 2) (user_b), D(i, 1)=(renaming user_a to user_b)

V(i, 2)+C2 (renaming user_b to user_c)=V(i, 3) (user_c), D(i, 2)=(renaming user_a to user_c)

V(i, 3)+C3 (renaming user_c to user_a)=V(i, 4) (user_a), D(i, 4)=zero because the user is renamed back, V(i, 4)=V(i, 1)

V(i, 4)+C4 (renaming user_a to user_d)=V(i, 5) (user_d), D(i, 5)=(renaming user_a to user_d)

. . .

V(i, n)+Cn (renaming user_n to user_f)=V(i, n+1) (user_f), D(i, n)=(renaming user_a to user_f)

Consequently, when distributing policy version DV (i+1) after the sequence of incremental changes, the accumulated delta D(i, n) (or D(i)) from V(i, 1) to V(i, n+1) is "user_a is renamed to user_f."

Figure 11:
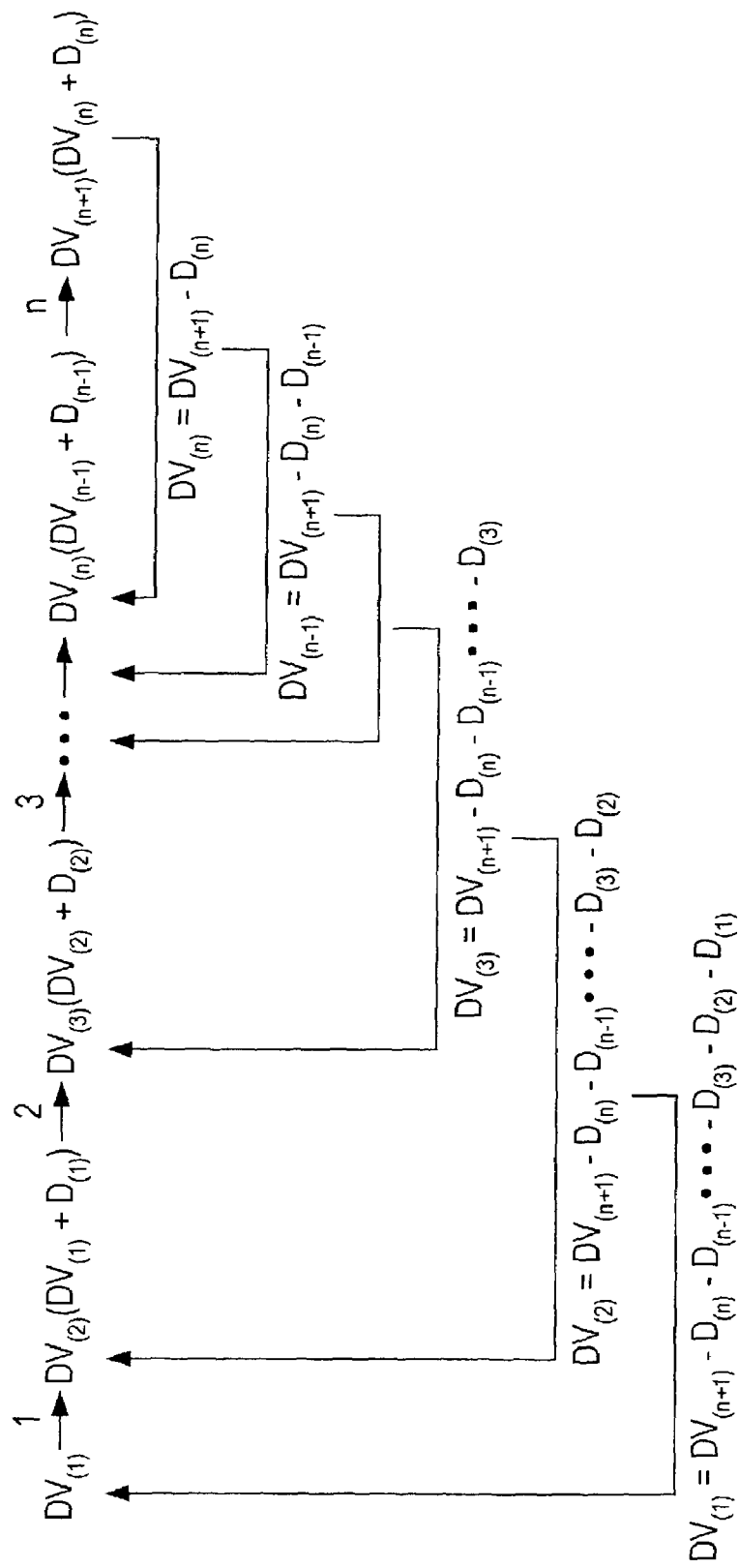
FIG. 11 shows the principle of reconstructing a previously enforced version of a local client security policy stored in an application guard, in accordance with the invention.

FIG. 11 shows the principle of reconstructing a previously enforced version of a local client security policy, in accordance with the invention. In case an error occurs in the currently enforced version of the local client security policy, the reconstruction enables the policy to be easily rolled back to one of the earlier enforced versions, in a simple and fast way. The currently enforced policy version is assumed to be DV(n+1), which is stored in enterprise policy (database) 224 (FIG. 2A) and local client policy (database) 318 (FIG. 3A). The sequence of previously enforced versions of the local client security policy is represented as DV(n), DV(n−1), . . . , DV(3), DV(2), DV(1), which are stored in policy change tracking table 233. In FIG. 11, a policy version DV(i) (i>1) is updated by DV(i−1)+D(i−1), where D(i) is the accumulated delta from DV(i−1) to DV(i). Each D(i), which is also stored in the policy change tracking table, can be generated by using the process shown in FIG. 10. Therefore, the sequence of policy versions can be represented by the equation set A as follows:

$DV(2)=DV(1)+D(1)$, ($D(1)$ is the delta from $DV(1)$ to $DV(2)$ $DV(3)=DV(2)+D(2)$, $D(2)$ is the delta from $DV(2)$ to $DV(3)$

. . .

$DV(n+1)=DV(n)+D(n)$, $D(n)$ is the delta from $DV(n)$ to $DV(n+1)$

According to the above equation set A, the process of reconstructing a previously enforced version of the local client security policy can be represented by the equation set B as follows:

$DV(n)=DV(n+1)+(-D(n))$ $DV(n-1)=DV(n+1)+(-D(n)-D(n-1))$

. . .

$DV(2)=DV(n+1)+(-D(n)-D(n-1)-D(n-2)- \ldots -D(3)-D(2))$ $DV(1)=DV(n+1)+(-D(n)-D(n-1)-D(n-2)- \ldots -D(3)-D(2)-D(1))$ In the equation set B, −D(i) represents the reversing rule changes of accumulated delta, D(i). In the policy reconstruction process, policy change reversing 232 (FIG. 2A) combines the sequence of respective D(i) s in a reversing order to generate an accumulated reversing delta, D(reversing), which will be used to reconstruct a previously enforced version of the local client security policy. For example, to reconstruct DV(1), policy change reversing 232 combines a reversing sequence of (−D(n)−D(n−1)− . . . −D(3)−D(2)−D (1)) as D(reversing) and transmits it to application guard 310 (FIG. 3A), which in turn reconstructs the previously enforced policy version DV(1) by combining DV(n+1) and D(reversing). By distributing only the accumulated reversing delta, D(reversing), the invention reduces network congestion and distribution time to construct a previously enforced version of a local client security policy. The principle shown in FIG. 11 can also be used to reverse the incremental changes shown in FIG. 10.

In the process of reconstructing previously enforced version of a local client security policy, DV(i), policy change reversing 232 (FIG. 2A) keeps track of the reversing changes of D(i), computes a respective D(reversing), and updates D(i) in policy change tracking table 233 (FIG. 2A).

To illustrate an application of the principle shown in FIG. 11, a process is provided to show a policy reconstruction from DV(4) to DV(2), where:

$DV(3)=DV(2)+D(2)$ (renaming user_a to user_f)

$DV(4)=DV(3)+D(3)$ (add user_t, renaming user_f to user_z)

To reconstruct DV(2) from DV(4):

$DV(3)=DV(4)+(-D(3))$ (delete user_t, renaming user_z to user_f)

$DV(2)=DV(3)+(-D(2))$ (renaming user_f to user_a)

In this example, the accumulated reversing delta, −D(reversing), is "delete user_t and renaming user_z to user_a."

Figure 12:
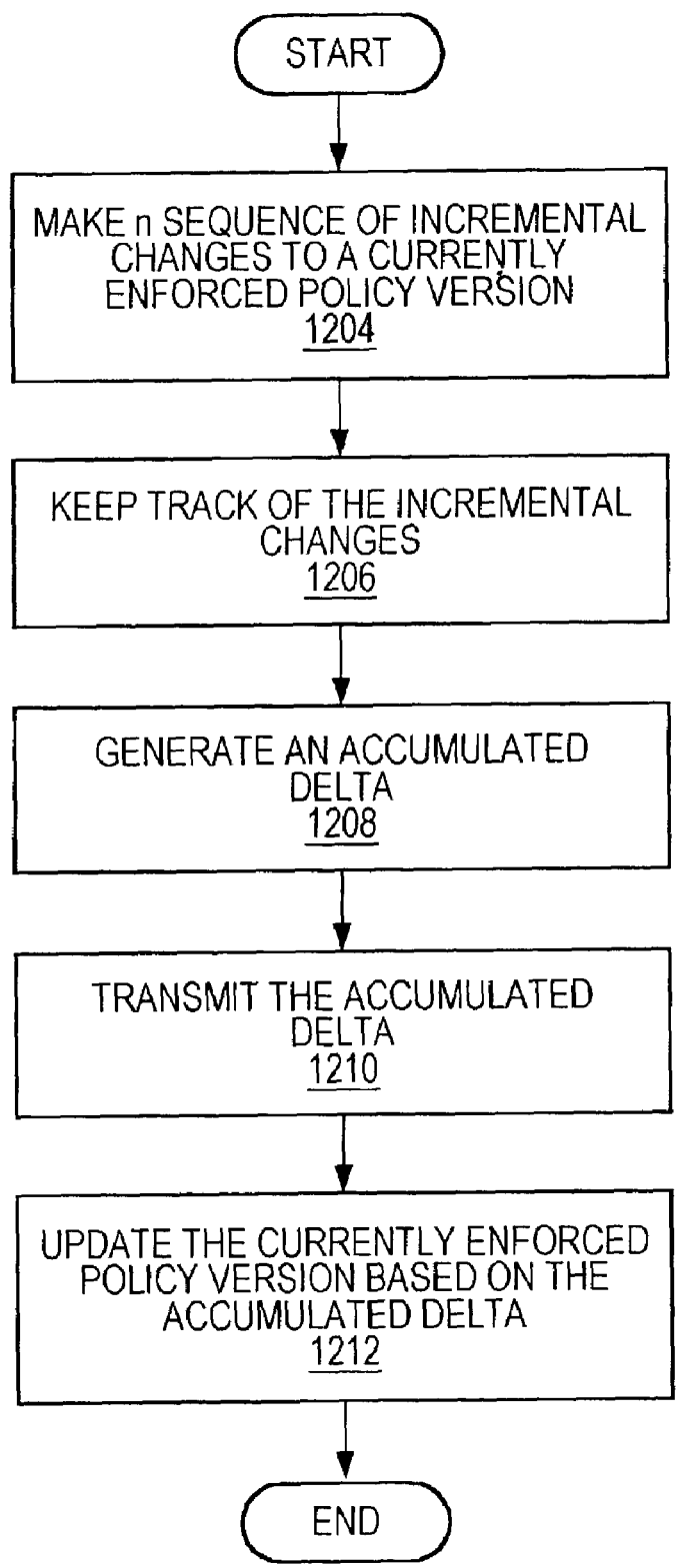
FIG. 12 is a flowchart illustrating a process of updating a currently enforced version of a local client security policy stored in an application guard based on distributing, through a network to the application guard, accumulated changes to the currently enforced version of the security policy, in accordance with the invention.

FIG. 12 is a flowchart illustrating a process of generating an updated version of a local client security policy (i.e., DV(i+1)) based on the accumulation of incremental changes to a currently enforced version of the security policy (i.e., DV(i), which is stored in enterprise policy 224 (FIG. 2A) and in local client policy 318 (FIG. 3A)), by distributing an accumulated delta, via a distributed network, to the relevant application guard 310, in accordance with the invention.

In step 1204, a user makes n sequences of incremental changes C1, C2, . . . , Cn to the currently enforced version of the local client security policy, DV(i), as shown in FIG. 10.

In step 1206, policy change tracking 230 (FIG. 2A) keeps track of the sequence of incremental changes Cj and generates a respective accumulated delta D(i, j) (j=1, 2, . . . , n), while the user is making the changes. The sequence of incremental changes can be done in different days.

In step 1208, at the $n^{th}$ incremental change, the user indicates that he/she has completed all changes, and then policy change tracking 230 generates an accumulated delta D(i) as shown in FIG. 10, stores the accumulated delta D(i) into policy change tracking table 233 (FIG. 2A), and sends the accumulated delta D(i) to policy distributor 214 (FIG. 2A).

In step 1210, policy distributor 214 transmits the accumulated delta D(i) via network 114 to application guard 310 (FIG. 3A).

In step 1212, application guard 310 updates the currently enforced policy version DV(i) to new policy version DV(i+1), based on the accumulated delta D(i).

Figure 13:
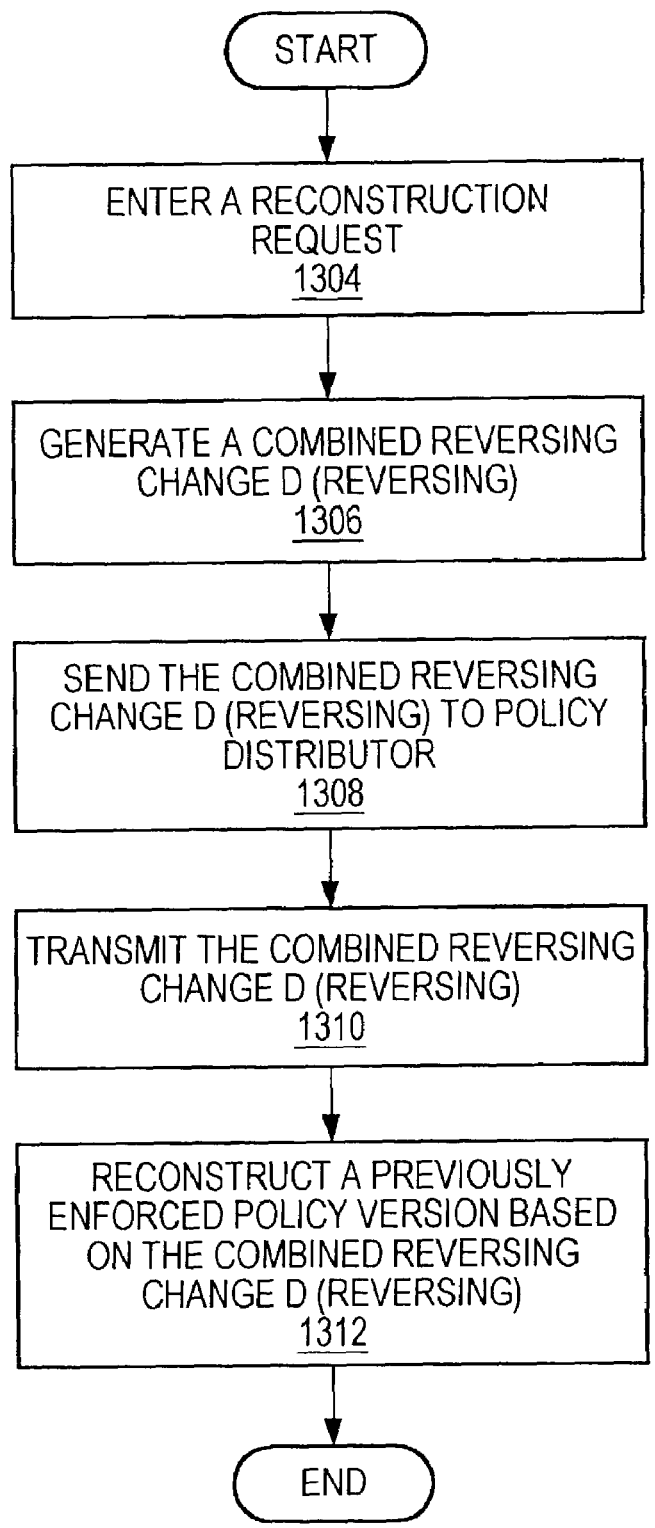
FIG. 13 is a flow chart illustrating a process of reconstructing, in an application guard, a previously enforced version of a local client security policy based on distributing, through a network to the application guard, accumulated changes to the previously enforced version of the security policy, in accordance with the invention.

FIG. 13 is a flowchart illustrating a process of reconstructing a previously enforced version of a local client security policy (i.e., DV(2)) based on the accumulation of incremental changes to the previously enforced version of the security policy (i.e., DV(n+1), which is stored in enterprise policy 224 (FIG. 2A) and local client policy 318 (FIG. 3A)), by distributing an accumulated reversing delta, via a distributed network, to the relevant application guard 310, in accordance with the invention.

In step 1304, a user enters a reconstruction request for reconstructing DV(n+1) to DV(2) as shown in FIG. 11.

In step 1306, policy change reversing 232 (FIG. 2A) performs reversing changes to D(n), D(n-1), . . . , D(3), D(2)) to generate an accumulated reversing delta, D(reversing).

In step 1308, policy change reversing 232 sends D(reversing) to policy distributor 214 (FIG. 2A).

In step 1310, policy distributor 214 transmits the D(reversing) to application guard 310 (FIG. 3A) via network 114.

In step 1312, application guard 310 reconstructs policy version DV(2) by combining D(reversing) and DV(n+1).

A global security policy may contain thousands of interrelated rules which are enforced for many functional branches of an enterprise and hundreds of applications over thousands of users across the enterprise. To enable managers and policy administrators to efficiently and comprehensively manage or maintain a sound security policy, the invention provides a system capable of performing comprehensive policy analysis, including policy inquiry, policy verification, and policy cross-referencing, with respect to both the global and local client security policies. The preferred analysis is based on the policy data designed according to the policy model, which includes rule inheritance, object hierarchy, role hierarchy, and other interrelationships between policy components.

The invention provides policy inquiry capability at both a front end (i.e., policy manager server 112) and a back end (i.e., client server 116). Specifically, at the front end, an administrative user can, upon authorization, query against the global policy database for rules granting or denying a specified privilege on a specified object to a specified subject. A typical policy inquiry at a modular description level contains one or more parameters that include grant or deny access type, privilege, object, and subject. At the back end, an application can submit a request to the BLE via BLE API to query for privileges and objects that a specified application user can access, to query for information as to why a specified application user is granted or denied a specified privilege on a specified object. Such a back end policy inquiry is performed against the local policy database 318 resident in the BLE. Exemplary front end queries are illustrated as follows:

Across enterprise applications,
"What can John Doe do?"
"What is John Doe forbidden to do?"

In an enterprise application,
"Who can monitor trade in a trading application?"
"What can a security auditor do with a trading application?"
"Can John Doe sell or buy ABCD security with a trading application?"
And for a specific query,
"Under what condition may John Doe deposit or withdraw from account XYZ in a trading application?"

Figure 14:
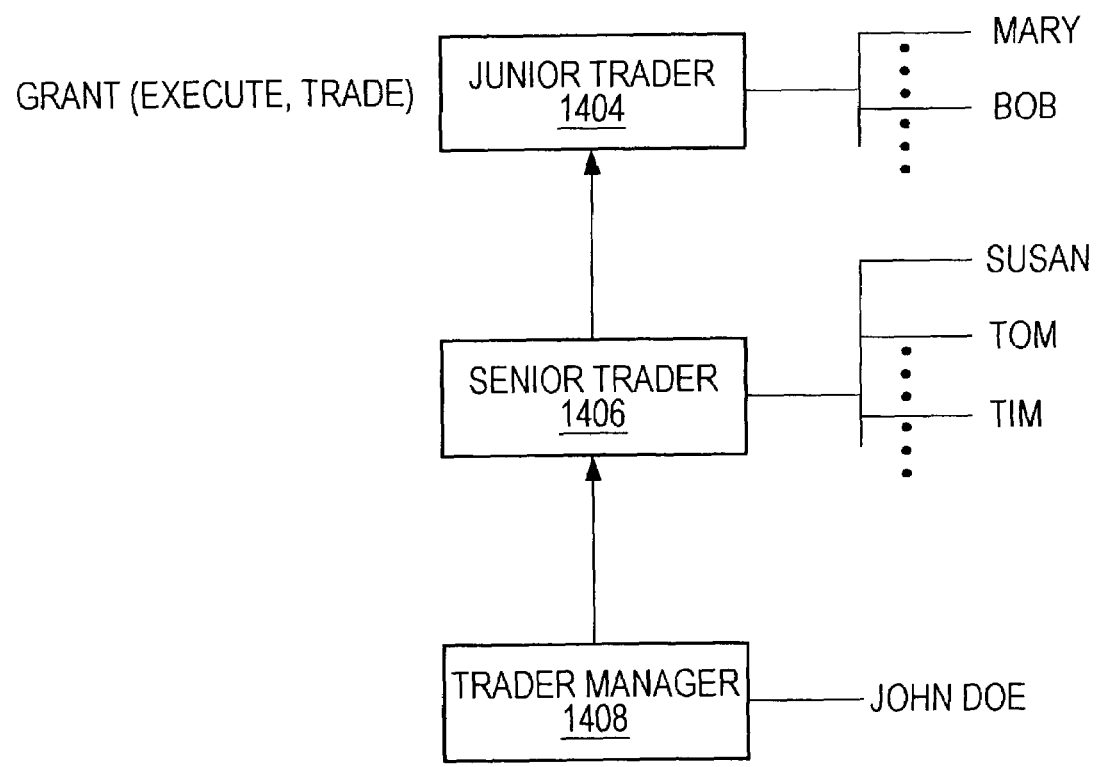
FIG. 14 is a block diagram illustrating an exemplary role hierarchy and rule inheritance.

FIG. 14 is a block diagram illustrating an exemplary role hierarchy and rule inheritance in reference to an operational chart in a fictitious stock trading company. In the block diagram, there are three roles arranged in a hierarchy structure, which contains three layers of roles, namely, "Junior Trader," "Senior Trader," and "Trader Manager." In FIG. 14, "A"→"B" means. "A" inherits rules (or access rights) from "B." For example, "Senior Trader"→"Junior Trader" means "Senior Trader" inherits rules (or access rights) from "Junior Trader."

Figure 15:
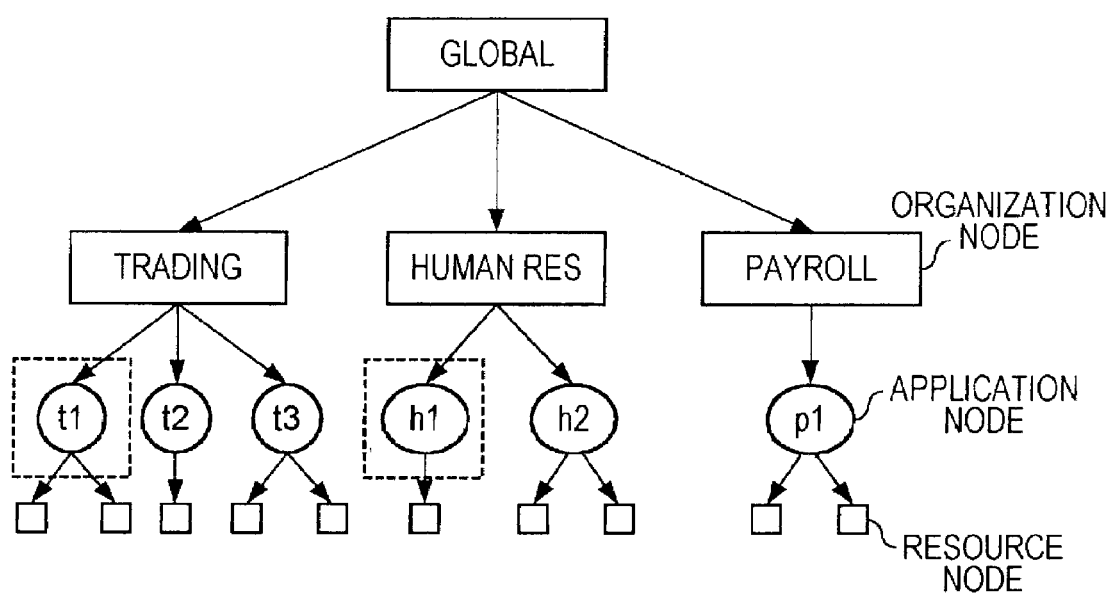
FIG. 15 is a block diagram illustrating an exemplary objects hierarchy.

FIG. 15 is a block diagram illustrating an exemplary objects hierarchy in reference to an organizational chart in a fictitious stocking trading company. In FIG. 15, four organization nodes are arranged in two layers, namely, "global," "trading," "human resources," and "payroll." Each organization node at the second layer is associated with one or more applications (i.e. t1, t2, and t3; h1 and h2; or p1). Each application is associated with one or more resources nodes. For example, if an application node is an intranet management application, the associated resources can be web pages; or if an application node is a database, the associated resources can be database table views.

When processing a policy inquiry, the system considers the rule inheritance, object hierarchy and role hierarchy as shown in FIGS. 14 and 15. The results present rules that match the given privilege, object, and subject in a query request. The hierarchy concept can be illustrated in reference to FIGS. 14 and 15, assume that in the policy, (1) John Doe is one of the trade managers in role 1408 (FIG. 14) being associated with "Trading" organization node (FIG. 15), and that "Junior Trader" 1404 is granted access rights to execute trades for securities X, Y and Z from 8 AM to 5 PM. Because "Trade Manager" 1408 is a role that inherits access rights from "Senior Traders" 1406, which further inherits access rights from "Junior Trader" 1406, a query "what can John Doe do?" presents the answer that John Doe is granted access rights to execute trades for securities X, Y and Z from 8 AM to 5 PM.

In addition to policy inquiry, the system of the invention supports other kinds of policy analysis, including policy verification, and policy cross-referencing. A "policy verification" query can find users who are both granted a specified privilege on a specified object and another specified privilege on another specified object. Therefore, a "policy verification" query usually poses two access questions. Inconsistency or contradiction occurs if any user has the privilege of these two accesses. Exemplary "policy verification" queries are:

"Which users can view investment banking deals and execute trades?"
"Which users can deposit funds and execute Accounts Receivable transactions?"
"Which users can write checks and approve checks?"

To illustrate the concept of policy verification, assume (1) John Doe inherits an accountant role, and an account manager role, in the multiple level role hierarchy, (2) there is a rule granting an accountant the privilege to issue payments including checks, cash, etc, and (3) there is a rule granting an account manager the privilege to approve checks. The query "Which users can write checks and approve checks?" lists John Doe as the answer. Such policy analysis must perform multiple policy inquiries and generate results that match the query input, taking into account the complex policy model.

A "policy cross-reference" query enables users to ask questions about how a policy element relates to other policy elements. Exemplary "policy cross-reference" queries are:
 "To what roles is this user assigned?"
 "What are other user names for this user in the policy?"
 "What rules have this privilege?"
 "Which rules have this user attribute in common?"

Both policy verification and policy cross-reference queries also take into account rule inheritance, object hierarchy and role hierarchy as is done with respect to a policy inquiry.

Figure 16:
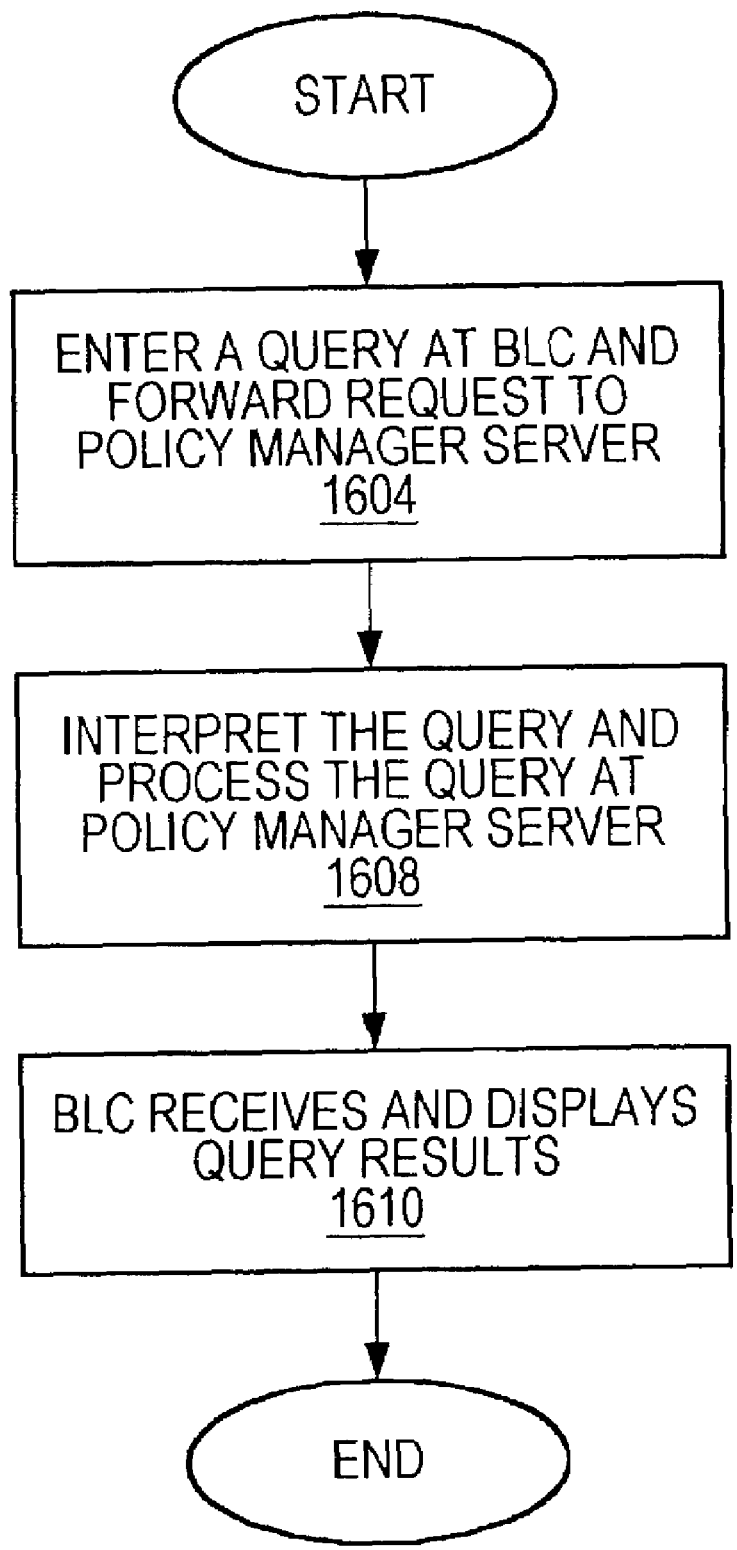
FIG. 16 is a flowchart illustrating a process of an administrative user performing policy analysis at the front end of a security system, in accordance with the invention.

FIG. 16 is an exemplary flowchart illustrating a process of performing a front-end policy analysis at a BLM 210 through a BLC 212 (FIG. 2A), in accordance with the invention.

In step 1604, BLC 212 receives a query containing one or more parameters from a user and forwards the query, together with the parameters, to policy manager 210.

In step 1608, upon receiving the query and the parameters, policy analysis 234 in policy manager 210 interprets the query and parameters, and executes the query against the global security policy 224 based on the object and role hierarchy, and rule inheritances shown in FIGS. 14 and 15.

In step 1610, BLC 212 receives and displays the query result (FIG. 1A).

Figure 17:
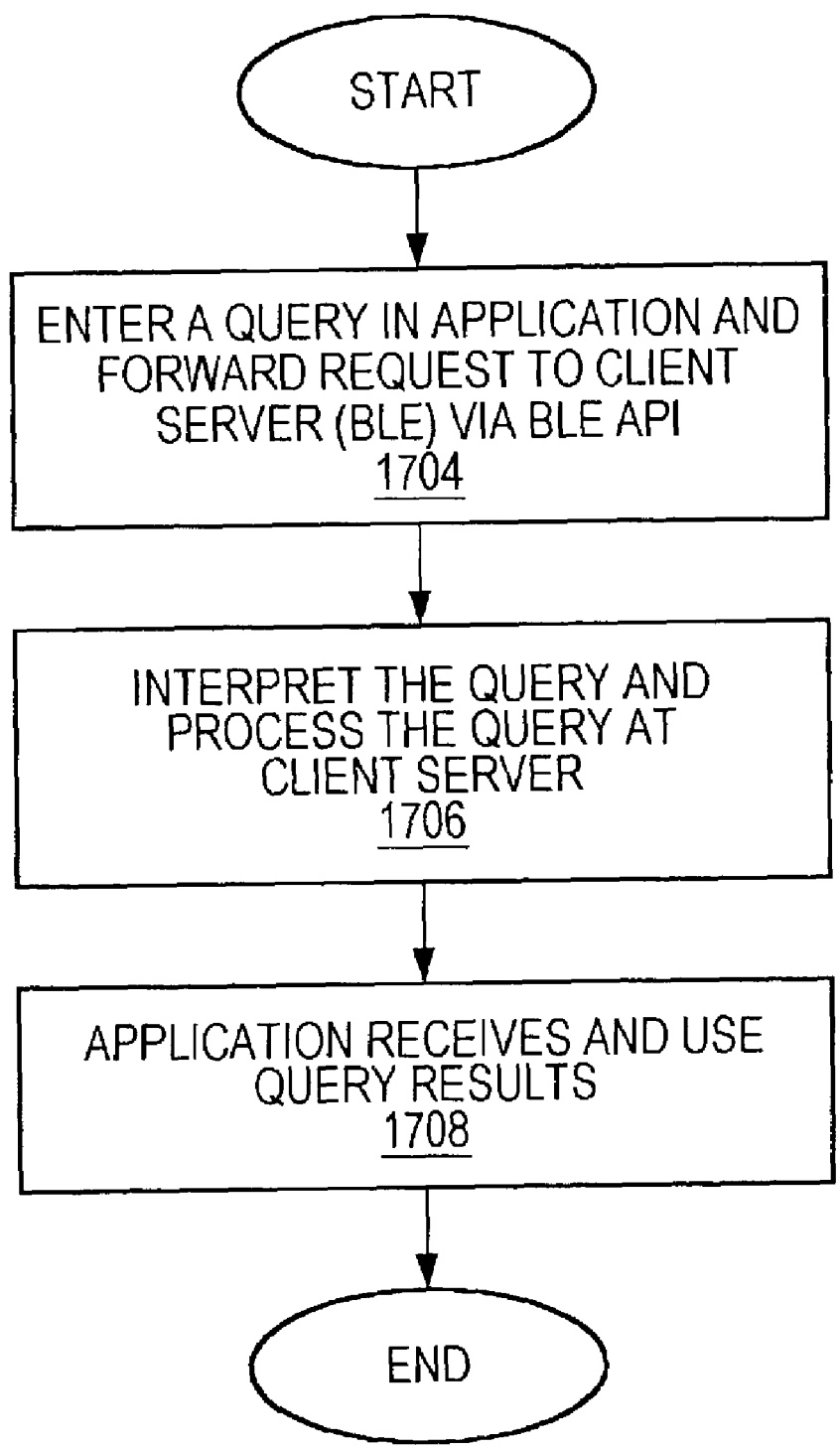
FIG. 17 is a flowchart illustrating a process of an application user performing policy analysis at the back end of a security system, in accordance with the invention.

FIG. 17 is a flowchart illustrating a process of performing a back-end policy analysis at a client server 116 for a query issued at an application, in accordance with the invention.

In step 1704, the application issues a query containing one or more parameters and sends the query, together with the parameters, to local policy analysis (engine) 319 via BLE API 332 (FIG. 3A). The query is programmed into the application by a user at a user terminal 118 (FIG. 1) or at a console (not shown) coupled to client server 116.

In step 1706, upon receiving the query and the parameters, local policy analysis 319 in a BLE (FIG. 3A) executes the query against the local client security policy based on the object and role hierarchy, and rule inheritances shown in FIGS. 14 and 15.

In step 1708, the application receives the query results and further processes the results according to the application's operational flow, which may display the results to the user.

The invention has been explained above with reference to a preferred embodiment. Other embodiments will be apparent to those skilled in the art in light of this disclosure. For example, the invention may readily be implemented using configurations other than those described in the preferred embodiment above.

One alternative embodiment involves locating a management system, zero or more engines, and a policy database on a single server and then replicating one or more copies on servers at various locations on the network. Synchronization of policy updates could occur through database replication.

Another alternative embodiment bundles a management system, zero or more engines, and a policy database on a single server and then synchronizes with local policy stores over the network following local authorization requests to the central server. However, compared with the embodiments discussed above, these two alternative embodiments may have drawbacks in terms of scalability and performance.

Additionally, the invention may effectively be used in conjunction with systems other than the one described above as the preferred embodiment. Therefore, these and other variations upon the preferred embodiments are intended to be covered by the invention, which is limited only by the appended claims.

APPENDIX A:

```
module BLE
{
   interface AgCredentialsManager;
   interface AgCredentials;
   interface AgInstance;
   interface DomainServiceFactory;
   interface DomainService;
   //-----------------------------------
   // DomainServiceFactory
   //-----------------------------------
   interface DomainServiceFactory
   {
     DomainService createDomainService(in string domain);
        // create domain service for the domain
   };
   interface DomainService
   {
     AgCredentialsManager createCredentialsMgr(in string application);
        // create credentials manager for the application
   };
   // This struct is set by the rule(s) evaluated and may contain
   // output information, both from the rule and global
   struct EvaluationResult {
      string ruleID;
      string privilege;
      string objectName;
      TRUTH_VALUE_ENUM decision;
      NVPairList data;
   };
   typedef sequence<EvaluationResult> EvaluationResultList;
   struct AccessElement
```

-continued

APPENDIX A:

```
{
  string privilege;
  string objectName;
  BLE::NVPairList inAttrList;
  boolean findAllFacts;
  BLE::EvaluationResultList results;
  TRUTH_VALUE_ENUM accessAllowed;
};
typedef sequence<AccessElement> AccessList;
typedef sequence<string> PrivilegeList;
typedef sequence<string> ObjectList;
typedef sequence<strinq> RoleList:
interface AgCredentials : Common::WBObject
{
  string getDomainName( );
  // get domain name
  string getLocationName( );
  // get location name
  string getApplicationName( );
  // get application name
  string getUserId( );
  // get userid
  TRUTH_VALUE_ENUM accessAllowed(   in BLE::NVPairList inAttrs,
                                    in string privilege,
                                    in string objectName,
                                    in boolean findAllFacts,
                                    out BLE::EvaluationResultList results)
      raises (Common::BadParameterException,
              BLE::CredvarException,
              BLE::InternalException,
              BLE::LogicException,
              BLE::InvalidUserException);
  // Solve policy. "inAttrs" is a list of input dynamic attributes
  // for the request. "results" is (possibly empty) list of
  // EvaluationResult data structures set by the BLE engine.
  // FindAllFacts, when set to true continues rules evaluation
  // after first deny or grant is found, to allow all
  // potentially firing rules to report any output attributes
  // as set by the administrator of the policy - it
  // should not be used if output attributes are not used
  // as it slows down evaluation considerably
  void bulkAccessAllowed(inout BLE::AccessList accessList)
      raises (Common::BadParameterException,
              BLE::CredvarException,
              BLE::InternalException,
              BLE::LogicException,
              BLE::InvalidUserException);
  // solve policy in bulk. All evaluation requests in accessList
  // will be processed at the same time.
  BLE::PrivilegeList queryPrivileges(   in string objectName,
                                        in boolean includedeny,
                                        in BLE::NVPairList inAttrs,
                                        in boolean findAllFacts,
                                        out BLE::EvaluationResultList results)
      raises (Common::BadParameterException,
              BLE::CredvarException,
              BLE::InternalException,
              BLE::LogicException,
              BLE::InvalidUserException);
  // query privileges on the object. if includedeny is true
  // auth eval will be computed on every priv-obj-subj combination
  // and all grants will be returned in privileges list.
  // if includedeny is false, no auth eval is done.
  // note that query result includes privilege propagation
  // on the object tree, so you do not know if privilege is
  // written directly on the object or is inherited
  BLE::ObjectList queryObjects(   in string privilege,
                                  in string clippingNode,
                                  in boolean includedeny,
                                  in BLE::NVPairList inAttrs,
                                  in boolean findAllFacts,
                                  out BLE::EvaluationResultList outAttrs)
```

-continued

APPENDIX A:

```
      raises (Common::BadParameterException,
           BLE::CredvarException,
           BLE::InternalException,
           BLE::LogicException,
           BLE::InvalidUserException);
      // Query objects below clipping node for the specified
privilege.
      // If includedeny is true AccessAllowed will be computed on
every
      // priv-obj-subj combination and all objects below clipping
node
      // will be returned in objects list. If includedeny is
false
      // no evaluation is done.
   boolean queryPerformance(  out double averageQueryLatency,
                              out double averageQueryLoad);
      // This call returns average AccessAllowed evaluation time
      // in seconds and average load on the engine - it is
      // available only if auditing is enabled - will return false
      // otherwise.
};
interface AgCredentialsManager
{
  string getDomainName( );
     // get domain name
  string getLocationName( );
     // get location name
  string getApplicationName( );
     // get application name
  AgCredentials findCredentials(in string userid)
     raises (Common::BadParameterException,
          BLE::InvalidUserException,
          BLE::InternalException,
          BLE::LogicException);
     // Find credentials for the userid. Either new or existing
     // credentials object can be returned.
  AgCredentials findCredentialsWithRoles(   in string userid,
                                            in BLE::RoleList roles)
     raises (Common::BadParameterException,
          BLE::InvalidUserException,
          BLE::InternalException,
          BLE::LogicException);
     // Find credentials for the userid and roles.
     // Either new or existing
     // credentials object can be returned.
};
//---------------------------------
// AgInstance
//---------------------------------
struct BindingDelta
{
  string action; // add
  string agname;
  string application;
};
typedef sequence<BindingDelta> BindingDeltaSeq;
struct DirectoryDelta
{
  string action; // del, ren
  string directory;
  string newDirectory;
};
typedef sequence<DirectoryDelta> DirectoryDeltaSeq;
struct UserDelta
{
  string action; // del, ren, add
  string user;
  string newUser;
};
typedef sequence<UserDelta> UserDeltaSeq;
struct RoleDelta
{
  string action; // del, ren, add
  string role;
  string newRole;
};
```

APPENDIX A:

```
typedef sequence<RoleDelta> RoleDeltaSeq;
struct RoleMemberDelta
{
   string action; // del, add
   string role;
   string member;
};
typedef sequence<RoleMemberDelta> RoleMemberDeltaSeq;
struct GlobalUserMappingDelta
{
   string action; // del, add
   string globalUser;
   string localUser;
};
typedef sequence<GlobalUserMappingDelta> GlobalUserMappingDeltaSeq;
struct GlobalRoleMappingDelta
{
   string action; //del, add
   string globalRole;
   string localRole;
};
typedef sequence<GlobalRoleMappingDelta> GlobalRoleMappingDeltaSeq;
struct GlobalSubjectDelta
{
   string action; // ren, del
   string globalSubject;
   string newGlobalSubject;
   string mappedDirectory;
};
typedef sequence<GlobalSubjectDelta> GlobalSubjectDeltaSeq;
struct SubjectAttributeDelta
{
   string action; // add, del
   string subject;
   string attr;
   string value;
   string type; // single: S, list: L
};
typedef sequence<SubjectAttributeDelta> SubjectAttributeDeltaSeq;
struct ObjectAttributeDelta
{
   string action; // add, del
   string objectName;
   string attr;
   string value;
   string type; // single: S, list: L
};
typedef sequence<ObjectAttributeDelta> ObjectAttributeDeltaSeq;
struct LogicalNamesDelta
{
   string action; // del, mod, add
   string objectName;
   string logicalName;
};
typedef sequence<LogicalNamesDelta> LogicalNamesDeltaSeq;
struct ObjectDelta
{
   string action; // del, ren, add
   string objectName;
   string newObjectName;
   string type; // A, 0 (this is for object)
};
typedef sequence<ObjectDelta> ObjectDeltaSeq;
struct DeclDelta
{
   string action; // del, mod, add (ren = del -> add)
   string text;
};
typedef sequence<DeclDelta> DeclDeltaSeq;
struct RuleDelta
{
   string action; // del, add
   string rule; // posid:rid:text (add); posid (del)
};
typedef sequence<RuleDelta> RuleDeltaSeq;
interface AgInstance //: SG::ServerGroupMember //: Common::WBObject
{
```

-continued

APPENDIX A:

```
    string getAgLocalName( );
    // get ag instance name
    string getDomainName( );
    // get domain name
    string getLocationName( );
    // get location name
    AgCredentialsManager getAgCredentialsManager (in string
application)
        raises(Common::BadParameterException);
    //returns a CredsMgr for a given application
    //raises badparm if application is not guarded by this AG
    void startPolicyUpdate( )
        raises(Common::RuntimeException);
    // start policy update
    void saveBindingDelta(in BindingDeltaSeq seq, in boolean more)
        raises(Common::RuntimeException);
    // save binding delta
    void saveDirectoryDelta(in DirectoryDeltaSeq seq, in boolean
more)
        raises(Common::RuntimeException);
    // save directory delta
    void saveUserDelta(in UserDeltaSeq seq, in boolean more)
        raises(Common::RuntimeException);
    // save user delta
    void saveRoleDelta(in RoleDeltaSeq seq, in boolean more)
        raises(Common::RuntimeException);
    // save role delta
    void saveRoleMemberDelta(in RoleMemberDeltaSeq seq, in boolean
more)
        raises(Common::RuntimeException);
    // save role membership delta
    void saveGlobalUserMappingDelta(   in GlobalUserMappingDeltaSeq
seq,
                                       in boolean more)
        raises(Common::RuntimeException);
    // save global user mapping delta
    void saveGlobalRoleMappingDelta(   in GlobalRoleMappingDeltaSeq
seq,
                                       in boolean more)
        raises(Common::RuntimeException);
    // save global role mapping delta
    void saveGlobalSubjectDelta(   in GlobalSubjectDeltaSeq
seq,
                                       in boolean more)
        raises(Common::RuntimeException);
    // save global subject delta
    void saveSubjectAttributeDelta(in SubjectAttributeDeltaSeq seq,
                        in boolean more)
    raises(Common::RuntimeException);
    // save user attribute delta
    void saveLogicalNamesDelta(   in LogicalNamesDeltaSeq seq,
                        in boolean more)
        raises(Common::RuntimeException);
    // save logical names delta
    void saveObjectDelta(in ObjectDeltaSeq seq, in boolean more)
        raises(Common::RuntimeException);
    // save object tree delta
    void saveObjectAttributeDelta(in ObjectAttributeDeltaSeq seq,
                        in boolean more)
        raises(Common::RuntimeException);
    // save object attribute delta
    void saveDeclDelta(in DeclDeltaSeq seq, in boolean more)
        raises(Common::RuntimeException);
    // save decl delta
    void saveRuleDelta(in RuleDeltaSeq seq, in boolean more)
        raises(Common::RuntimeException);
    // save rule delta
    string prepareToCommit(in long policyid, in boolean flush)
        raises(InvalidDataException,
            Common::RuntimeException);
    // prepare to commit policy update, return policy hash
    // input is new policy id and a flush flag, that instructs
    // app guard to flush it's current policy
    void commit( );
    // commit policy update
    void rollback( );
    // rollback policy update
```

-continued

APPENDIX A:

```
    oneway void invitationToRegister( );
    // register with policy distributor
    long getPolicyId( );
    // get app guard policy id
    double getProcessingRate( );
    // returns current moving average of the number of requests
processed
    // per second
    };
  };
```

We claim:

1. A system for updating a security policy in a distributed computing environment, comprising:
    a policy manager, coupled to a network, including
        a global version of a security policy;
        tracking means for recording a sequence of incremental changes to be made to the global version of the security policy at the policy manager;
        computing means for pre-computing an accumulated delta based on the sequence of incremental changes to the global version of the security policy, said pre-computing being executed prior to updating the security policy;
        updating means for combining the accumulated delta with the global version of the security policy to generate a second version of the security policy; and
        a policy distributor for determining which application guard the sequence of incremental changes is applicable to and for transmitting the accumulated delta to the application guard through the network; and
    the application guard, coupled to the network, for
        storing a local version of the security policy, said local version being a subset of the global version of the security policy;
        receiving the accumulated delta distributed through the network;
        updating the local version of the security policy by combining the received accumulated delta with the local version of the security policy to generate a copy of an updated local version of the security policy based on the sequence of incremental chances to the global version of the security policy; and
        storing the undated local version of the security policy.

2. The system of claim 1, wherein the global version of the security policy is stored in an enterprise policy data file.

3. The system of claim 1, wherein the accumulated delta is stored in a policy change tracking table.

4. The system of claim 1, wherein the second version of the security policy is stored in an enterprise policy data file.

5. The system of claim 1, wherein the sequence of incremental changes includes rule deletions, rule additions, or rule amendments.

6. A system for updating a plurality of security policies in a distributed computing environment, comprising:
    a policy manager, coupled to a network, including
        a first version of each of a plurality of security policies;
        tracking means for recording a sequence of incremental changes to be made to the first version of each security policy;
        computing means for pre-computing a respective accumulated delta for each sequence of incremental changes, said pre-computing being executed prior to updating the first version of the security policy;
        updating means for combining each accumulated delta with the first version of its respective security policy to generate a second version of the respective security policy; and
        a policy distributor for determining which of a plurality of application guards the sequence of incremental changes is applicable to and for distributing each of the accumulated deltas to the application guards through the network; and
    the plurality of application guards, coupled to the network, each
        storing a copy of the first version of one the plurality of security policies;
        receiving a respective accumulated delta distributed through the network;
        updating the first version at each of the application guards by combining the received accumulated delta with the copy of the respective first version of the security policy to generate a copy of the respective second version of the security policy based on the sequence of incremental chances to the first version at the policy manager; and
        storing the copy of the respective second version of the security policy.

7. The system of claim 6, wherein the first version of each of a plurality of security policies is stored in an enterprise policy data file.

8. The system of claim 6, wherein each of the accumulated deltas is stored in a policy change tracking table.

9. The system of claim 6, wherein the second version of the respective security policy is stored in an enterprise policy data file.

10. The system of claim 6, wherein each sequence of incremental changes includes rule deletions, rule additions, or rule amendments.

11. A system for reconstructing a security policy in a distributed computing environment, comprising:
    a policy manager, coupled to a network, including
        a global version of a security policy;
        tracking means for recording a sequence of incremental changes to be made to the global version of the security policy;
        computing means for pre-computing an accumulated delta based on the sequence of incremental changes to the global version of the security policy said pre-computing being executed prior to updating the global version of the security policy;
        a policy change tracking table for storing the accumulated delta;

updating means for combining the accumulated delta with the global version of the security policy to generate a second version of the security policy stored in an enterprise policy data file;

reversing means for generating an accumulated reversing delta based on the sequence of incremental changes to the global version of the security policy;

updating means for combining the accumulated reversing delta with the second version of the security policy to reconstruct the global version of the security policy; and a policy distributor for determining which application guard the sequence of incremental chances is applicable to and for distributing the accumulated delta and the accumulated reversing delta to the application guard through the network; and the application guard, coupled to the network, for storing a copy of the local version of the security policy;

receiving the accumulated delta and the accumulated reversing delta distributed through the network;

updating the copy of the local version at the application guard by combining the accumulated delta with the copy of the local version of the security policy to generate a copy of an updated local version of the security policy in the application guard based on the sequence of incremental chances to the global security policy; and combining the accumulated reversing delta with a copy of the updated local version of the security policy to reconstruct a copy of the local version of the security policy in the application guard.

12. The system of claim 11, wherein the global version of the security policy is stored in an enterprise policy data file.

13. The system of claim 11, wherein the accumulated delta is stored in a policy change tracking table.

14. The system of claim 11, wherein the second version of the security policy is stored in an enterprise policy data file.

15. The system of claim 11, wherein the sequence of incremental changes includes rule deletions, rule additions, or rule amendments.

16. A system for reconstructing a plurality of security policies in a distributed computing environment, comprising:

a policy manager, coupled to a network, including a first version of each of a plurality of security policies;

tracking means for recording a sequence of incremental changes to the first version of each security policy;

computing means for pre-computing an accumulated delta for each sequence of incremental changes said pre-computing being executed prior to updating the first version of each security policy;

updating means for combining each accumulated delta with the first version of its respective security policy to generate a second version of the respective security policy;

reversing means for generating a plurality of accumulated reversing deltas, each based on a sequence of incremental changes to the first version of a respective security policy;

updating means for combining each accumulated reversing delta with the second version of its respective security policy to reconstruct the first version of the respective security policy; and a policy distributor for determining which of a plurality of application guards the sequence of incremental chances is applicable to and for distributing each accumulated delta and each accumulated reversing delta to the application guards through the network; and the plurality of application guards, coupled to the network, each storing a copy of the first version of one of the security policies;

receiving a respective accumulated delta and a respective accumulated reversing delta distributed through the network; and capable of updating the copy of the first version stored at each application guard by combining the received respective accumulated delta with the copy of the first version of the security policy stored in the application guard to generate a copy of the second version of the security policy in the application guard based on the sequence of incremental changes to the first version at the policy manager; and combining the respective accumulated reversing delta with the copy of the second version of the security policy stored in the application guard to reconstruct a copy of the first version of the security policy in the application guard.

17. The system of claim 16, wherein the first version of each of a plurality of security policies is stored in an enterprise policy data file.

18. The system of claim 16, wherein each accumulated delta is stored in a policy change tracking table.

19. The system of claim 16, wherein the second version of the respective security policy is stored in an enterprise policy data file.

20. The system of claim 16, wherein each sequence of incremental changes includes rule deletions, rule additions, or rule amendments.

21. A method for incrementally distributing a security policy in a distributed computing environment, comprising:

storing a global version of a security policy in a policy manager coupled to a network, and a local version of the security policy in an application guard coupled to the network;

recording a sequence of incremental changes to the global version of the security policy at the policy manager;

pre-computing an accumulated delta based on the sequence of incremental changes, said pre-computing being executed prior to updating the local version of the security policy stored in the application guard;

combining the accumulated delta with the global version of the security policy to generate a updated global version of the security policy;

determining by the policy manager, which application guard the incremental changes are applicable to, based on the local version of the security policy stored on the application guard;

distributing the accumulated delta through the network to the application guard in order to update the local version of the security policy stored at the application guard;

receiving in the application guard the accumulated delta distributed through the network; and updating the local version of the security policy at the application guard by combining the received accumulated delta with the copy of the local version of the security policy stored in the application guard to generate a copy of the updated local version of the security policy based on the series of incremental changes to the global version of the security policy.

22. The method of claim 21, wherein the undated local version of the security policy DV(i+1), the local version of the security policy DV(i), and the accumulated delta D(i) are related according to the equation, DV(i+1)=DV(i)+D(i) wherein i represents a number of distributions of the accumulated delta.

23. The method of claim 21, wherein recording a sequence of incremental changes comprises recording rule deletions, rule additions, or rule amendments.

24. A method for incrementally distributing a plurality of security policies in a distributed computing environment, comprising:
   storing a first version of each of a plurality of security policies in a policy manager coupled to a network;
   storing a copy of the first version of each security policy in a respective application guard coupled to the network;
   recording a sequence of incremental changes to the first version of each security policy at the policy manager;
   pre-computing a plurality of accumulated deltas based on respective sequences of incremental changes, said pre-computing being executed prior to updating the security policy at the respective application guard;
   combining each accumulated delta with the first version of its respective security policy to generate a second version of the respective security policy;
   determining which of the application guards, the sequence of incremental chances is applicable to;
   distributing each of the accumulated deltas to the application guards through the network in order to update the security policy at the application guards;
   receiving in each of the application guards a respective accumulated delta distributed through the network; and
   updating the first version of the security policy by combining the respective accumulated delta with the copy of the first version of the security policy stored in the application guard to generate a copy of the second version of the security policy based on the sequence of incremental changes at the policy manager.

25. The method of claim 24, wherein the second version of a security policy DV(i+1), the first version of that security policy DV(i), and the respective accumulated delta D(i) are related according to the equation, DV(i+1)=DV(i)+D(i) wherein i represents a number of distributions of the respective accumulated delta.

26. The method of claim 24, wherein recording a sequence of incremental changes comprises recording rule deletions, rule additions, or rule amendments.

27. A method for reconstructing a security policy in a distributed computing environment, comprising:
   storing a global version of a security policy in a policy manager coupled to a network, and a local version in an application guard coupled to the network;
   recording a sequence of incremental changes to be made to the global version of the security policy;
   pre-computing an accumulated delta based on the sequence of incremental changes, said pre-computing being executed prior to updating the local version of the security policy at the application guard;
   combining the accumulated delta with the global version of the security policy to generate a second global version of the security policy;
   determining which application guard the sequence of incremental chances is applicable to;
   distributing the accumulated delta through the network to the application guard in order to update the security policy at the application guard;
   receiving the distributed accumulated delta in the application guard;
   combining the accumulated delta with the local version of the security policy to generate a copy of an updated version of the security policy based on the sequence of incremental chances to the global security policy;
   generating an accumulated reversing delta based on the sequence of incremental changes to the global version of the security policy;
   combining the accumulated reversing delta with the updated global version of the security policy to reconstruct the global version of the security policy in the policy manager;
   distributing the accumulated reversing delta through the network; and
   receiving the distributed accumulated reversing delta in the application guard;
   combining the accumulated reversing delta with the updated local version of the security policy to reconstruct the copy of the local version of the security policy in the application guard.

28. The method of claim 27, wherein the updated local version of the security policy DV(n+1), the local version of the security policy DV(n), and the accumulated reversing delta (−D(n)) are related according to the equation, DV(n)=DV(n+1)+(−D(n)) wherein n represents a number of incremental changes.

29. The method of claim 27, wherein recording a sequence of incremental changes comprises recording rule deletions, rule additions, or rule amendments.

30. A method for reconstructing a plurality of security policies in a distributed computing environment, comprising:
   storing a first version of each of a plurality of security policies in a policy manager coupled to a network;
   storing the first version of each security policy in a respective application guard coupled to the network;
   recording a respective sequence of incremental changes to the first version of each security policy;
   pre-computing a respective accumulated delta for each sequence of incremental changes, said pre-computing being executed prior to updating the first version of the security policy at the respective application guard;
   combining each accumulated delta with the first version of its respective security policy to generate a second version of the respective security policy;
   determining which application guards the sequence of incremental changes is applicable to;
   distributing each of the accumulated deltas through the network to the application guards in order to update the security policy at the application guards;
   receiving in each of the application guards a respective accumulated delta distributed through the network;
   combining the received accumulated delta with the copy of the first version of the security policy to generate a copy of the second version of the security policy in each application guard based on the sequence of incremental changes at the policy manager;
   generating a plurality of accumulated reversing deltas, each based on an accumulation of incremental changes to the first version of a respective security policy;
   combining each accumulated reversing delta with the second version of its respective security policy to reconstruct the first version of the respective security policy;
   distributing the each of the accumulated reversing deltas through the network;

receiving in each of the application guards a respective accumulated reversing delta distributed through the network; and combining the received accumulated reversing delta with the copy of the second version of the security policy to reconstruct the copy of the first version of the security policy in the application guard.

31. The method of claim 30, wherein the second version of a security policy DV(n+1), the first version of that security policy DV(n), and the respective accumulated reversing delta (−D(n)) are related according to the equation, DV(n)=DV(n+1)+(−D(n)) wherein n represents a number of incremental changes.

32. The method of claim 30, wherein recording a sequence of incremental changes comprises recording rule deletions, rule additions, or rule amendments.

* * * * *

UNITED STATES PATENT AND TRADEMARK OFFICE
CERTIFICATE OF CORRECTION

PATENT NO. : 7,363,650 B2
APPLICATION NO. : 10/243122
DATED : April 22, 2008
INVENTOR(S) : Moriconi et al.

It is certified that error appears in the above-identified patent and that said Letters Patent is hereby corrected as shown below:

On page 3, in column 2, under "Other Publications", line 21–22, delete "Languages" and insert -- Language --, therefor.

On page 3, in column 2, under "Other Publications", line 29, delete "Progamming" and insert -- Programming --, therefor.

On page 3, in column 2, under "Other Publications", line 40, delete "Distribution" and insert -- Distributed --, therefor.

On page 3, in column 2, under "Other Publications", line 41, delete "of" and insert -- on --, therefor.

On page 3, in column 2, under "Other Publications", line 55, delete "Imcompletely" and insert -- Incompletely --, therefor.

On page 4, in column 1, under "Other Publications", line 39, delete "Convington," and insert -- Covington, --, therefor.

In column 6, line 17–18, delete "components," and insert -- components --, therefor.

In column 6, line 38, after "client" delete "security".

In column 7, line 50, delete "case" and insert -- ease --, therefor.

In column 10, line 63, delete "enterprises" and insert -- enterprise --, therefor.

In column 11, line 48, after "214" delete "then".

In column 11, line 50, after "policy" insert -- 318 --.

In column 16, line 14, delete "D(i) s" and insert -- D(i)s --, therefor.

In column 16, line 25, delete "construct" and insert -- reconstruct --, therefor.

In column 18, line 16, delete "means." and insert -- means --, therefor.

In column 21, line 14, delete "<strinq> RoleList:" and insert -- <string> RoleList; --, therefor.

In column 21, line 65, delete "if" and insert -- If --, therefor.

CERTIFICATE OF CORRECTION (continued)
U.S. Pat. No. 7,363,650 B2

In column 29, line 46, in claim 1, delete "chances" and insert -- changes --, therefor.

In column 29, line 48, in claim 1, delete "undated" and insert -- updated --, therefor.

In column 30, line 38, in claim 6, delete "chances" and insert -- changes --, therefor.

In column 31, line 13, in claim 11, delete "chances" and insert -- changes --, therefor.

In column 31, line 27, in claim 11, delete "chances" and insert -- changes --, therefor.

In column 31, line 67, in claim 16, delete "chances" and insert -- changes --, therefor.

In column 32, line 51, in claim 21, delete "determining" and insert -- determining, --, therefor.

In column 33, line 1, in claim 22, delete "undated" and insert -- updated --, therefor.

In column 33, line 28, in claim 24, delete "chances" and insert -- changes --, therefor.

In column 33, line 64, in claim 27, delete "chances" and insert -- changes --, therefor.

In column 34, line 6, in claim 27, delete "chances" and insert -- changes --, therefor.

Signed and Sealed this

Second Day of February, 2010

David J. Kappos
*Director of the United States Patent and Trademark Office*